(12) United States Patent
Fu et al.

(10) Patent No.: US 12,082,211 B2
(45) Date of Patent: Sep. 3, 2024

(54) WIRELESS COMMUNICATION METHOD, TERMINAL DEVICE AND NETWORK DEVICE

(71) Applicant: GUANGDONG OPPO MOBILE TELECOMMUNICATIONS CORP., LTD., Guangdong (CN)

(72) Inventors: Zhe Fu, Dongguan (CN); Qianxi Lu, Dongguan (CN)

(73) Assignee: GUANGDONG OPPO MOBILE TELECOMMUNICATIONS CORP., LTD., Guangdong (CN)

( * ) Notice: Subject to any disclaimer, the term of this patent is extended or adjusted under 35 U.S.C. 154(b) by 252 days.

(21) Appl. No.: 17/565,339

(22) Filed: Dec. 29, 2021

(65) Prior Publication Data
US 2022/0124792 A1 Apr. 21, 2022

Related U.S. Application Data

(63) Continuation of application No. PCT/CN2019/100670, filed on Aug. 14, 2019.

(51) Int. Cl.
*H04W 72/23* (2023.01)
*H04L 1/08* (2006.01)
(Continued)

(52) U.S. Cl.
CPC ............. *H04W 72/23* (2023.01); *H04L 1/08* (2013.01); *H04L 1/1812* (2013.01); *H04W 72/1263* (2013.01); *H04W 72/566* (2023.01)

(58) Field of Classification Search
None
See application file for complete search history.

(56) References Cited

U.S. PATENT DOCUMENTS 11,297,642 B2 * 4/2022 Chin ..................... H04L 1/1887
11,395,284 B2 * 7/2022 Baek ................... H04W 72/569
(Continued)

FOREIGN PATENT DOCUMENTS

| CN | 102447549 A | 5/2012 |
|---|---|---|
| CN | 107005984 A | 8/2017 |

(Continued)

OTHER PUBLICATIONS

LG Electronics Inc., "UL data prioritization for the DG/CG conflict and the CG/CG conflict", R2-1905016, 3GPP TSG-RAN WG2 Meeting #105bis, Xi'an, China, Apr. 8-Apr. 12, 2019, all pages.
(Continued)

*Primary Examiner* — Anh Vu H Ly
(74) *Attorney, Agent, or Firm* — Ladas & Parry, LLP

(57) ABSTRACT

A wireless communication method, a terminal device and a network device, the method includes: a terminal device determines, according to first information, whether to retransmit deprioritized data on a configured grant resource and/or determines a target resource location for retransmitting the deprioritized data, where the first information includes at least one of the following: a running state of a configured grant timer; a configured grant resource location after the configured grant timer is started; whether the deprioritized data is scheduled during a first time period after the configured grant timer is started; whether the deprioritized data is transmitted during a second time period after the configured grant timer is started; whether the deprioritized data is cleared during a third time period after the configured grant timer is started.

19 Claims, 6 Drawing Sheets

200

A terminal device determines, according to first information, whether to retransmit deprioritized data on a configured grant resource and/or determines a target resource location for retransmitting the deprioritized data, where the first information includes at least one of the following: a running state of a configured grant timer; a configured grant resource location after the configured grant timer is started; whether the deprioritized data is scheduled during a first time period after the configured grant timer is started; whether the deprioritized data is transmitted during a second time period after the configured grant timer is started; whether the deprioritized data is cleared during a third time period after the configured grant timer is started — S210

(51) Int. Cl.
*H04L 1/1812* (2023.01)
*H04W 72/1263* (2023.01)
*H04W 72/566* (2023.01)

(56) References Cited

U.S. PATENT DOCUMENTS

| | | | |
|---|---|---|---|
| 2019/0098640 | A1 | 3/2019 | Holakouei et al. |
| 2020/0314681 | A1* | 10/2020 | Kuo .................. H04W 72/23 |

FOREIGN PATENT DOCUMENTS

| | | | | |
|---|---|---|---|---|
| CN | 107682891 | A | 2/2018 | |
| CN | 108781434 | A | 11/2018 | |
| CN | 109644343 | A | 4/2019 | |
| CN | 109906578 | A | 6/2019 | |
| CN | 110022608 | A | 7/2019 | |
| CN | 110035543 | A | 7/2019 | |
| EP | 3917265 | A1 * | 12/2021 | ........... H04L 1/1822 |
| EP | 3928453 | A2 | 12/2021 | |
| EP | 3993536 | A1 | 5/2022 | |
| WO | 2019098663 | A1 | 5/2019 | |
| WO | WO-2020146247 | A2 * | 7/2020 | ........... H04L 1/1812 |
| WO | 2020/170043 | A2 | 8/2020 | |
| WO | WO-2021015455 | A1 * | 1/2021 | ........ H04W 72/1247 |
| WO | 2021026846 | A1 | 2/2021 | |

OTHER PUBLICATIONS

The first Office Action of corresponding European application No. 19941535.7, dated Mar. 24, 2023.
International Search Report (ISR) dated May 6, 2020 for Application No. PCT/CN2019/100670.
Huawei et al: "Further discussion on transmission of de-prioritized data due to intra-UE prioritization", 3GPP TSG-RAN WG2 Meeting#106, R2-1906507, Reno, United States, May 13-17, 2019, May 3, 2019(May 3, 2019) section 2.
Written Opinion of the International Searching Authority in the international application No. PCT/CN2019/100670, mailed on May 6, 2020, with English translation provided by Google Translate, all pages.
The EESR of corresponding European application No. 19941535.7, dated Apr. 7, 2022.
Nokia et al: "Configured grant operation for NR-U", 3GPP Draft; R2-1906757, 3rd Generation Partnership Project (3GPP), Mobile Competence Centre; 650, Route Des Lucioles; F-06921 Sophia-Antipolis Cedex; France, vol. RAN WG2, No. Reno, USA; May 13, 2019-May 17, 2019 May 13, 2019 (May 13, 2019), XP051730213, entire document.
Qualcomm Incorporated: "Remaining Aspects of Configured Grant Transmission for NR-U", 3GPP Draft; R2-1906414, 3rd Generation Partnership Project (3GPP), Mobile Competence Centre; 650, Route Des Lucioles; F-06921 Sophia-Antip, vol. RAN WG2, No. Reno, USA; May 13, 2019-May 17, 2019 May 13, 2019(May 13, 2019), XP051729879, entire document.
OPPO: "Enhancements of configured grant in NR-U", 3GPP Draft; R2-1905612, 3rd Generation Partnership Project (3GPP), Mobile Competence Centre; 650, Route Des Lucioles; F-06921 Sophia-Antipolis Cedex; France, vol. RAN WG2, No. Reno, USA; May 13, 2019-May 17, 2019 May 13, 2019 (May 13, 2019), XP051729115, entire document.
Zte Corporation et al: "Timer used for configured grant and dynamic grant in NR-U", 3GPP Draft; R2-1906313, 3rd Generation Partnership Project (3GPP), Mobile Competence Centre; 650, Route Des Lucioles; F-06921 Sophia-Antipol, vol. RAN WG2, No. Reno, USA; May 13, 2019-May 17, 2019 May 13, 2019(May 13, 2019), XP051729780, entire document.
Samsung: "Configured Grants in NR-U", 3GPP Draft; R2-1907638, 3rd Generation Partnership Project (3GPP), Mobile Competence Centre; 650, Route Des Lucioles; F-06921 Sophia-Antipolis Cedex; France, vol. RAN WG2, No. Reno, USA; May 13, 2019-May 17, 2019 May 13, 2019(May 13, 2019), XP051731072, entire document.
The first Office Action of corresponding Chinese application No. 201980092863.7 with search report, dated May 16, 2024, and its English translation.

* cited by examiner

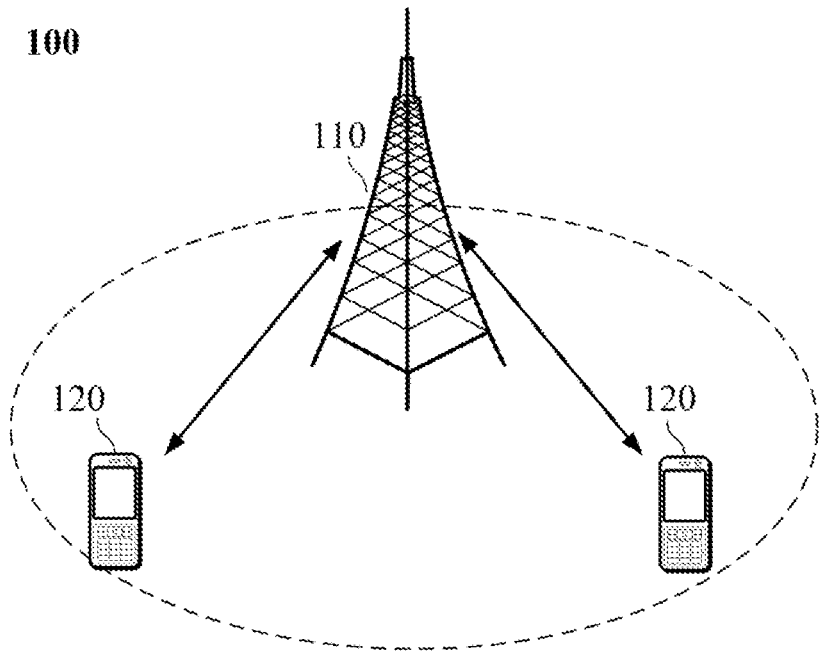

A terminal device determines, according to first information, whether to retransmit deprioritized data on a configured grant resource and/or determines a target resource location for retransmitting the deprioritized data, where the first information includes at least one of the following: a running state of a configured grant timer; a configured grant resource location after the configured grant timer is started; whether the deprioritized data is scheduled during a first time period after the configured grant timer is started; whether the deprioritized data is transmitted during a second time period after the configured grant timer is started; whether the deprioritized data is cleared during a third time period after the configured grant timer is started ⎫ S210

> If a network device receives deprioritized data at a specific configured grant resource location, the network device does not perform retransmission scheduling on the deprioritized data, where the specific resource location is determined according to first information, and the first information includes at least one of the following: a running state of a configured grant timer; a configured grant resource location after the configured grant timer is started; whether the deprioritized data is scheduled during a first time period after the configured grant timer is started; whether the deprioritized data is transmitted during a second time period after the configured grant timer is started; whether the deprioritized data is cleared during a third time period after the configured grant timer is started ⟵ S310

> A network device schedules and retransmits deprioritized data according to a running state of a configured grant timer ⟵ S410

FIG. 6

Terminal device 500

Determining module 510

FIG. 7

WIRELESS COMMUNICATION METHOD, TERMINAL DEVICE AND NETWORK DEVICE

CROSS-REFERENCE TO RELATED APPLICATIONS

This application is a continuation of International Application No. PCT/CN2019/100670, filed on Aug. 14, 2019, entitled "WIRELESS COMMUNICATION METHOD, TERMINAL DEVICE AND NETWORK DEVICE", the content of which is incorporated herein by reference in its entirety.

TECHNICAL FIELD

Embodiments of the present application relates to the communication field and, in particular, to a wireless communication method, a terminal device and a network device.

BACKGROUND

In a new radio (NR) system, it is necessary to support the transmission of multiple services, such as a factory automation service, a transport industry service, a smart power service, etc. In this way, there may be a situation where a resource allocated to the same terminal conflict in time-domain. For example, a base station schedules a transmission of an enhanced mobile broadband (eMBB) service on an uplink grant (UL grant) and then schedules a transmission of an ultra-reliable and low latency communication (URLLC) on another UL grant, a media access control (MAC) entity of a terminal device may packetize the service on each UL grant to obtain two mac protocol data units (PDU), for example, MAC PDU1 and MAC PDU2 corresponding to hybrid automatic repeat request (HARQ) process 1 and HARQ process 2, respectively, and if these two UL grants overlap in time-domain, only one MAC PDU may be transmitted (for example, MAC PDU2 is transmitted), and MAC PDU1 is stored in a buffer corresponding to the HARQ process, then MAC PDU1 is a deprioritized MAC PDU, when there is subsequent data need to use the HARQ process 1, the MAC PDU1 will be flushed, resulting in data loss. Therefore, how to perform retransmission of a deprioritized MAC PDU to reduce the probability of data loss is an urgent problem.

SUMMARY

The embodiments of the present application provide a wireless communication method, a terminal device and a network device, which are beneficial to reduce the probability of deprioritized data loss.

In a first aspect, a wireless communication method is provided, including: determining, by a terminal device, according to first information, whether to retransmit deprioritized data on a configured grant resource and/or determining a target resource location for retransmitting the deprioritized data, where the first information includes at least one of the following: a running state of a configured grant timer; a configured grant resource location after the configured grant timer is started; whether the deprioritized data is scheduled during a first time period after the configured grant timer is started; whether the deprioritized data is transmitted during a second time period after the configured grant timer is started; and, whether the deprioritized data is cleared during a third time period after the configured grant timer is started.

In a second aspect, a wireless communication method is provided, including: not performing, by a network device, retransmission scheduling on deprioritized data if the network device receives the deprioritized data at a specific configured grant resource location, wherein the specific configured grant resource location is determined according to first information, and the first information comprises at least one of the following: a running state of a configured grant timer; a configured grant resource location after the configured grant timer is started; whether the deprioritized data is scheduled during a first time period after the configured grant timer is started; whether the deprioritized data is transmitted during a second time period after the configured grant timer is started; and, whether the deprioritized data is cleared during a third time period after the configured grant timer is started.

In a third aspect, a wireless communication method is provided, including: scheduling and retransmitting, by a network device, deprioritized data according to a running state of a configured grant timer.

In a fourth aspect, a terminal device is provided, which is configured to execute the method according to the above-mentioned first aspect or any possible implementation of the first aspect. Specifically, the terminal device includes a unit configured to execute the method according to the above-mentioned first aspect or any possible implementation manner of the first aspect.

In a fifth aspect, a network device is provided, which is configured to execute the method according to the above-mentioned second aspect or any possible implementation of the second aspect. Specifically, the network device includes a unit configured to execute the method according to the above-mentioned second aspect or any possible implementation manner of the second aspect.

In a sixth aspect, a network device is provided, which is configured to execute the method according to the above-mentioned third aspect or any possible implementation of the third aspect. Specifically, the network device includes a unit configured to execute the method according to the above-mentioned third aspect or any possible implementation manner of the third aspect.

In a seventh aspect, a terminal device is provided, the terminal device includes a processor and a memory. The memory is configured to store a computer program, the processor is configured to call and run the computer program stored in the memory to execute the method according to the above-mentioned first aspect or each of its implementations.

In an eighth aspect, a network device is provided, the network device includes a processor and a memory. The memory is configured to store a computer program, the processor is configured to call and run the computer program stored in the memory to execute the method according to the above-mentioned second aspect to the third aspect or each of their implementations.

In a ninth aspect, a chip is provided, which is configured to execute the method according to the above-mentioned first aspect to the third aspect or each of their implementations.

Specifically, the chip includes: a processor, configured to call and run the computer program stored in the memory, to enable a device installed with the chip to execute the method according to any one of the above-mentioned first aspect to the third aspect or each of their implementations.

In a tenth aspect, a computer-readable storage medium is provided, which is configured to store a computer program, the computer program enables a computer to execute the method according to any one of the above-mentioned first aspect to the third aspect or each of their implementations.

In an eleventh aspect, a computer program product is provided, which includes a computer program instruction, the computer program instruction enables a computer to execute the method according to any one of the above-mentioned first aspect to the third aspect or each of their implementations.

In a twelfth aspect, a computer program is provided, which, when run on a computer, enables the computer to execute the method according to any one of the above-mentioned first aspect to the third aspect or each of their implementation manners.

Based on the above-mentioned technical solution, a terminal device may determine whether to retransmit deprioritized data according to whether the deprioritized data is scheduled or not, transmitted or not, cleared or not after the configured grant timer is started, which is beneficial to avoid the conflict between the retransmission scheduling of the deprioritized data by the network device and the retransmission of the deprioritized data by the terminal device itself, and also beneficial to ensure a timely retransmission of the deprioritized data in a condition that the deprioritized data is not scheduled by the network device, reduce a transmission delay and is beneficial to meet a transmission need of a service with a high delay requirement.

BRIEF DESCRIPTION OF DRAWINGS

FIG. 1 is a schematic diagram of an application scenario provided by an embodiment of the present application.

FIG. 2 is a schematic diagram of a wireless communication method provided by an embodiment of the present application.

FIG. 5 is a schematic diagram of another wireless communication method provided by an embodiment of the present application.

FIG. 6 is a schematic diagram of yet another wireless communication method provided by an embodiment of the present application.

FIG. 7 is a schematic block diagram of a terminal device provided by an embodiment of the present application.

DESCRIPTION OF EMBODIMENTS

Figure 3:
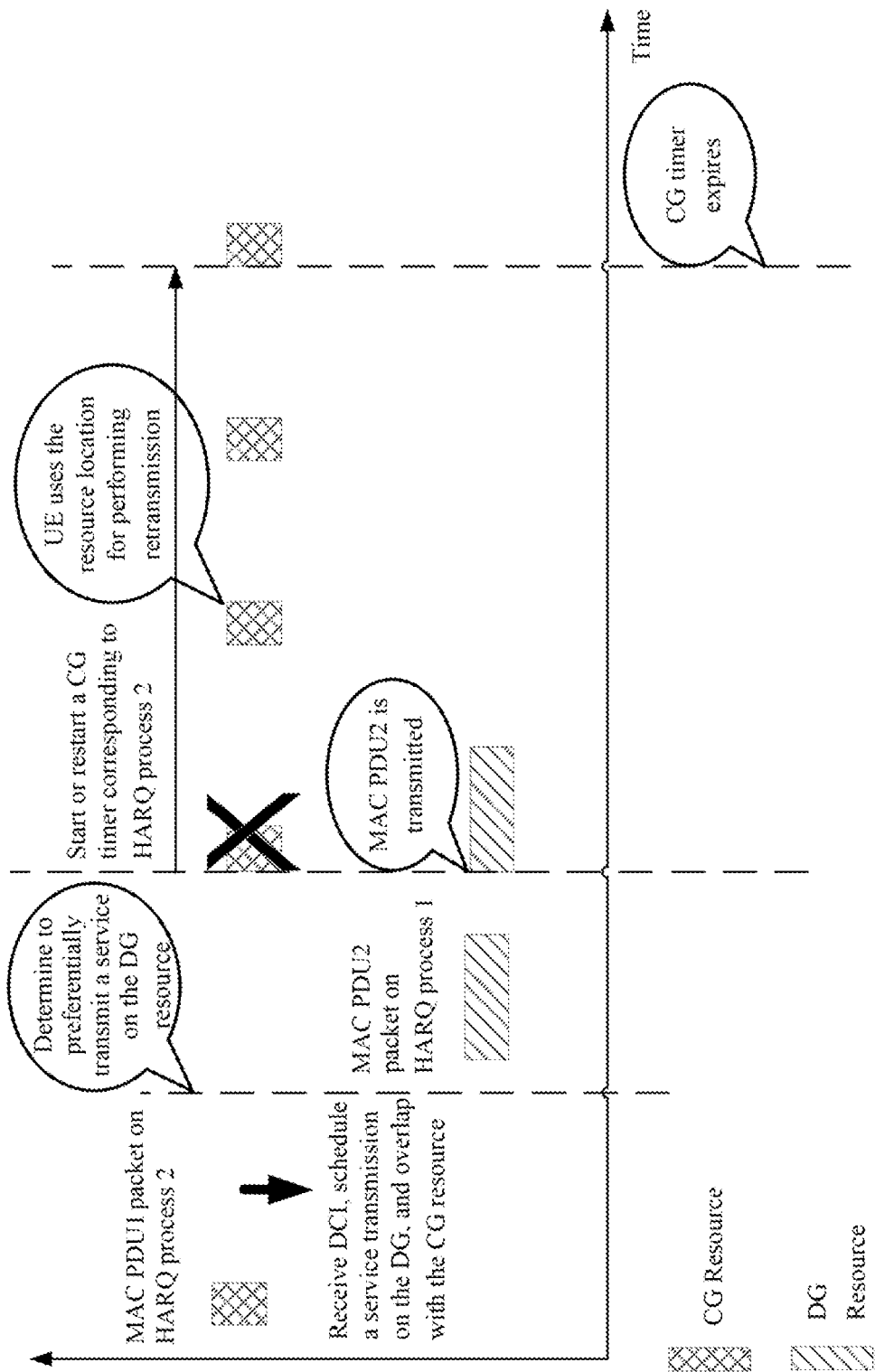
FIG. 3 is a schematic diagram of transmitting deprioritized data according to a specific embodiment.

Technical solutions in the embodiments of the present application will be described below in combination with the accompanying drawings in the embodiments of the present application, and it is clear that the embodiments described are a part of the embodiments of the present application, but not all of them. Based on the embodiments in the present application, all other embodiments obtained by those skilled in the art without making creative labor fall within the scope of protection of the present application.

The technical solutions of the embodiments of the present application may be applied to various communication systems, such as a global system of mobile communication (GSM) system, a code division multiple access (CDMA) system, a wideband code division multiple access (WCDMA) system, a general packet radio service (GPRS), a long term evolution (LTE) system, an LTE frequency division duplex (FDD) system, an LTE time division duplex (TDD), a universal mobile telecommunication system (UMTS), a worldwide interoperability for microwave access (WiMAX) communication system or a 5G system, etc.

Exemplarily, a communication system 100 applied in the embodiment of the present application is shown in FIG. 1. The communication system 100 may include a network device 110, and the network device 110 may be a device that communicates with a terminal device 120 (or referred to as a communication terminal or a terminal). The network device 110 may provide communication coverage for a specific geographic area and may communicate with a terminal device located within the coverage area. In an embodiment, the network device 110 may be a base station (BTS) in a GSM system or a CDMA system, a NodeB (NB) in a WCDMA system, an evolutional NodeB (eNB or eNodeB) in an LTE system, or a radio controller in a cloud radio access network (CRAN), or the network device may be a mobile switching center, a relay station, an access point, an in-vehicle device, a wearable device, a hub, a switch, a bridge, a router, a network side device in a 5G network, or a network device in a future evolved public land mobile network (PLMN), etc.

The communication system 100 also includes at least one terminal device 120 located within a coverage area of the network device 110. As a "terminal device" used herein, includes but is not limit to, a connection via a wired line, such as via a public switched telephone network (PSTN), a digital subscriber line (DSL), a digital cable, and a direct cable connection; and/or another data connection/network; and/or via a wireless interface, such as, for a cellular network, a wireless local area network (WLAN), a digital TV network such as a DVB-H network, a satellite network, an AM-FM broadcast transmitter; and/or an apparatus that is set to receive/send a communication signal of another terminal device; and/or an internet of things (IoT) device. A terminal device set to communicate through a wireless interface may be referred to as a "wireless communication terminal", a "wireless terminal" or a "mobile terminal". An example of a mobile terminal includes but is not limit to, a satellite or a cellular phone; a personal communications system (PCS) terminal that may combine a cellular radio phone with a data processing, a fax, and a data communication capability; a PDA may include a radio phone, a pager, an Internet/intranet access, a Web browser, a memo pad, a calendar, and/or a global positioning system (GPS) receiver; as well as a conventional laptop and/or a palmtop receiver or another electronic apparatus including a radio telephone transceiver. A terminal device may refer to an access terminal, a user equipment (UE), a user unit, a user station, a mobile station, a mobile platform, a remote station, a remote terminal, a mobile device, a user terminal, a terminal, a wireless communication device, a user agent, or a user apparatus. An access terminal may be a cellular phone, a cordless phone, a session initiation protocol (SIP) phone, a wireless local loop (WLL) station, a personal digital assistant (PDA), and a handheld device with a wireless communication function, a computing device or another processing device connected to a wireless modem, an in-vehicle device, a wearable device, a terminal device in a 5G network, or a terminal device in a future evolution PLMN, etc.

In an embodiment, a device to device (D2D) communication may be performed between the terminal devices 120.

In an embodiment, a 5G system or a 5G network may also be referred to as a new radio (NR) system or an NR network.

FIG. 1 exemplarily shows a network device and two terminal devices, in an embodiment, the communication system 100 may include multiple network devices and a coverage area of each network device may include other numbers of terminal devices, which are not limited in the embodiment of the present application.

In an embodiment, the communication system 100 may also include other network entities such as a network controller and a mobility management entity, which are not limited by the embodiment of the present application.

It should be understood that a device with a communication function in a network/system in the embodiment of the present application may be referred to as a communication device. Taking the communication system 100 shown in FIG. 1 as an example, the communication device may include a network device 110 and a terminal device 120 with a communication function, the network device 110 and the terminal device 120 may be a specific device described above, which will not be repeated here. The communication device may also include other devices in the communication system 100, such as a network controller, a mobility management entity, and another network entity, which are not limited by the embodiment of the present application.

It should be understood that the terms "system" and "network" herein are often used interchangeably herein. The term "and/or" herein is only an association relationship describing an associated object, which means that there may be three kinds of relationships, for example, A and/or B, which may mean: A alone exists, A and B exist at the same time, B alone exists, these three situations. In addition, the character "/" herein generally indicates that the associated objects before and after being in an "or" relationship.

FIG. 2 is a schematic flowchart of a wireless communication method 200 provided by an embodiment of the present application. The method 200 may be executed by the terminal device in the communication system shown in FIG. 1. As shown in FIG. 2, the method 200 may include at least part of the following content:

S210, a terminal device determines, according to first information, whether to retransmit deprioritized data on a configured grant resource and/or determines a target resource location for retransmitting the deprioritized data, where the first information includes at least one of the following: a running state of a configured grant timer; a configured grant resource location after the configured grant timer is started; whether the deprioritized data is scheduled during a first time period after the configured grant timer is started; whether the deprioritized data is transmitted during a second time period after the configured grant timer is started; whether the deprioritized data is cleared during a third time period after the configured grant timer is started.

It should be understood that the deprioritized data in the embodiment of the present application is generated under a condition that the resource conflicts. For example, when a first uplink resource conflicts with a second uplink resource, if only the data on the first uplink resource is transmitted, then the data on the first uplink resource may be referred to as the prioritized data or the prioritized MAC PDU, and the un-transmitted data on the second uplink resource may be referred to as the deprioritized data or the deprioritized MAC PDU.

In an embodiment, the conflict between the first uplink resource and the second uplink resource may be referred to that the first uplink resource and the second uplink resource at least partially overlap in time-domain. For example, the start time of the first uplink resource and the second uplink resource may be the same, and the end time may be different, or the start time of the first uplink resource and the second uplink resource may be different, and the end time may be the same, or the start time of the first uplink resource and the second uplink resource may be different, the end time may also be different, and the middle part may overlap, or the start time of the first uplink resource and the second uplink resource may be the same, and the end time may also be the same, which is not limited in the embodiments of the present application.

In an embodiment, the first uplink resource may be an uplink resource such as a configured grant (CG) resource, a dynamic grant (DG) resource, an uplink grant of an uplink shared channel (UL-SCH), or an uplink grant of uplink control information (UCI), which is not limited in the embodiments of the present application.

In an embodiment, the second uplink resource may be an uplink resource such as a CG resource, a DG resource, an uplink grant of a UL-SCH, or an uplink grant of UCI, which is not limited in the embodiments of the present application. In the following, taking a conflict between a CG resource and a DG resource as an example for a description, but the embodiments of the present application is not limited to this.

In the embodiment of the present application, a CG resource is a semi-statically scheduled resource. After a network device configures the CG resource for a terminal device, it may be configured and activated (for example, for a Type-1 CG resource (Type-1 CG)), or the CG resource may be activated again through the dynamic signaling such as the DCI (for example, for a Type-2 CG resource (Type-2 CG)), after the CG resource is activated, the terminal device may use the CG resource for a transmission, and the CG resource may usually be a periodic resource, the terminal device may use the CG resource multiple times for a data transmission.

In the embodiments of the present application, a DG resource is a dynamically scheduled resource. After the network device configures the DG resource for the terminal device, the terminal device may use the DG resource for a transmission, and the DG resource is usually a single-use resource. After the network device configures the DG resource, the terminal device usually may only use the DG resource for a single transmission.

In the embodiment of the present application, the CG resource may correspond to one or more HARQ process numbers, the data transmitted on the CG resource may be transmitted using a HARQ process number corresponding to the CG resource, and different CG resources may correspond to the same HARQ process number, for example, a CG resource 1 with a start location to and a CG resource 2 with a start location $t_1$ may correspond to a same HARQ process number. When data transmitted in the CG resource 1 is packaged at the time to and a MAC PDU1 is obtained, the MAC PDU1 may be stored in the HARQ process. After the time instant $t_1$, since the two CG resources correspond to the same HARQ process number, the MAC PDU1 will be flushed. In order to reduce the probability of data loss, each HARQ process may be configured to correspond to a configured grant timer (configuredGrantTimer), a MAC PDU saved in the HARQ process is not flushed during the running of the configured grant timer. When the HARQ process is used to transmit a MAC PDU, the configured grant timer is started or restarted, for example, when a MAC PDU2 on the CG resource 2 is transmitted at the time instant $t_1$, the configuration grant timer corresponding to the HARQ process number is started or restarted, the MAC PDU1 is not flushed before the configured grant timer expires.

In the embodiments of the present application, a network device may schedule a retransmission of the deprioritized data (noted as manner 1), or, a terminal device may also perform a retransmission of the deprioritized data by itself (noted as manner 2). When the above-mentioned two retransmission methods exist, how to perform a retransmission of the deprioritized data to optimize system performance is a problem that needs to be addressed.

Based on the above-mentioned technical problem, the terminal device may determine, based on a running state of a configured grant timer, in combination with a scheduling situation of the deprioritized data, a transmission situation of the deprioritized data and a processing situation of the deprioritized data after the configured grant timer is started, whether to retransmit the deprioritized data by itself, and/or, in a condition that the deprioritized data is determined to be retransmitted by itself, the terminal device may also determine a target resource location for retransmitting the deprioritized data.

In the following, in combination with Embodiment 1 to Embodiment 3, a specific implementation of performing retransmission of the deprioritized data is respectively described based on the scheduling situation of the deprioritized data, the transmission situation of the deprioritized data and the processing situation of the deprioritized data after the configured grant timer is started.

Embodiment 1:

In some embodiments, a scheduling situation of the deprioritized data may include at least one of the following: whether the deprioritized data is scheduled (or in other words, whether the deprioritized data is dynamically scheduled), whether the deprioritized data is retransmission scheduled, whether the deprioritized data is initial transmission scheduled, etc.

As an example, whether the deprioritized data is scheduled may be determined according to whether a scheduling instruction of a network device for the deprioritized data is received, for example, if a scheduling instruction from a network device for the deprioritized data is received, it may be determined that the deprioritized data is scheduled; or, if a scheduling instruction from a network device for the deprioritized data is not received, it may be determined that the deprioritized data is not scheduled.

As another example, in a condition that a scheduling instruction is received, whether the deprioritized data is initial transmission scheduled may be determined according to the indication information included in the scheduling instruction, the indication information may be a new data indication (NDI), for example, the NDI is not inverted, which is used to indicate that the deprioritized data is retransmission scheduled, and the NDI is inverted, which is used to indicate that the deprioritized data is initial transmission scheduled, or the NDI is 1, which is used to indicate that the deprioritized data is retransmission scheduled, and the NDI is 0, which is used to indicate that the deprioritized data is initial transmission scheduled, or, if an NDI of a HARQ process where the deprioritized data is located is not inverted, it may be determined that the deprioritized data is not scheduled.

In the embodiment of the present application, the terminal device may determine whether to retransmit the deprioritized data according to whether the deprioritized data is scheduled during a first time period after a configuration grant timer is started.

The configured grant timer is a configured grant timer corresponding to a HARQ process where the deprioritized data is located, and when priority data corresponding to the deprioritized data starts to be transmitted, the configured grant timer may be started or restarted, further, the terminal device may determine whether to retransmit the deprioritized data by itself according to a scheduling situation of the deprioritized data within a period of time after the configured grant timer is started.

For example, if the deprioritized data is not scheduled during a first time period after the configured grant timer is started, it may be considered that the deprioritized data is not transmitted. In which case the terminal device may retransmit the deprioritized data, that is, the deprioritized data may be retransmitted using the aforementioned manner 2.

For another example, if the deprioritized data is scheduled during a first time period after the configured grant timer is started, then the terminal device may retransmit the deprioritized data on a DG resource scheduled by the network device, that is, the deprioritized data may be retransmitted using the aforementioned manner 1. In which case the terminal device may not need to retransmit the deprioritized data using the manner 2.

Therefore, in the embodiment of the present application, a terminal device may retransmit the deprioritized data by itself in a condition that a network device does not schedule the deprioritized data, on the one hand, it may avoid the conflict between the network scheduling retransmission of the deprioritized data and the terminal device retransmitting the deprioritized data by itself, on the other hand, it may prioritize the network scheduling retransmission of the deprioritized data, and at the same time, it may reduce a loss probability of the deprioritized data and ensure a reliable transmission of the deprioritized data.

Further, in a condition that it is determined to retransmit the deprioritized data, the terminal device may retransmit the deprioritized data on a configured grant resource, for example, the terminal device may retransmit the deprioritized data at one or more configured grant resource locations after the first time period.

As an example, the terminal device may retransmit the deprioritized data on at least one configured grant resource location after the first time period, the at least one configured grant resource location may be any configured grant resource location after the first time period.

As another example, the terminal device may retransmit the deprioritized data on first N configured grant resource locations after the first time period, or in other words, N configured grant resource locations starting from a 1-st configured grant resource location after the first time period, or in other words, at least one configured grant resource location starting from a 1-st configured grant resource location after the first time, where N is a positive integer, which is beneficial to ensure a timely transmission of the deprioritized data.

As a specific example, the terminal device may retransmit the deprioritized data at a 1-st configured grant resource location after the first time period, which is beneficial to ensure a timely transmission of the deprioritized data.

It should be understood that in the embodiment of the present application, the 1-st configured grant resource location after a first time period may be referred to as a 1-st available configuration grant resource location after the first time period, or a most recent configured grant resource location after the first time period.

In the following, in combination with a specific embodiment, a specific location of the first time period and a corresponding target resource location are described.

Embodiment 1-1: the first time period is a time period from when the configured grant timer is started to a 1-st configured grant resource location after the configured grant timer is started.

If the deprioritized data is not scheduled during the first time period, the terminal device may determine to retransmit the deprioritized data, and further determine a target resource location for retransmitting the deprioritized data.

As a specific example, the terminal device may determine a 1-st configured grant resource location after the configured grant timer is started as a target resource location for retransmitting the deprioritized data.

If the terminal device has not received a scheduling instruction for the deprioritized data from the network device during the time period from when the configured grant timer is started to the 1-st configured grant resource location after the configured grant timer is started, the terminal device may perform retransmission of the deprioritized data by itself at the 1-st configured grant resource location, which is beneficial to ensure a timely transmission of the deprioritized data, reduce a transmission delay and is beneficial to meet a transmission need of a service with a high delay requirement (for example, an ultra-reliable and low latency communication (URLLC)).

It should be understood that in the Embodiment 1-1, the target resource location may be another resource location described above, which is not limited in the embodiment of the present application. For example, any configured grant resource location after the 1-st configured grant resource location, or, N configured grant resource locations starting from the 1-st configured grant resource, etc., where N is an integer greater than 1.

Embodiment 1-2: the first time period is a time period from when the configured grant timer is started to an M-th configured grant resource location after the configured grant timer is started, where M is an integer greater than 1.

In the Embodiment 1-2, as a specific example, the terminal device may determine the M-th configured grant resource location after the configured grant timer is started as a target resource location for retransmitting the deprioritized data.

If the terminal device has not received a scheduling instruction for the deprioritized data from the network device during the time period from when the configured grant timer is started to an M-th configured grant resource location after the configured grant timer is started, the terminal device may perform retransmission of the deprioritized data by itself at the M-th configured grant resource location, which is beneficial to ensure a timely transmission of the deprioritized data, reduce a transmission delay and is beneficial to meet a transmission need of a service with a high delay requirement (for example, a URLLC service).

It should be understood that in the Embodiment 1-2, the target resource location may be another resource location described above, which is not limited in the embodiment of the present application. For example, any configured grant resource location after the M-th configured grant resource location, or, first N configured grant resource locations starting from the M-th configured grant resource, etc., where N is an integer greater than 1.

Embodiment 1-3: the first time period is at least part of a time period from when the configured grant timer is started to when the configured grant timer expires.

Assuming that the start time instant of a configured grant timer is $t_1$ and end time instant is $t_2$, then the first time period may be a part of a time period from the start time instant $t_1$ to the end time instant $t_2$.

For example, a time period from $t_1$ to $t_3$, where $t_3$ is earlier than $t_2$, in this case, a 1-st configured grant resource location after $t_3$, or first N configured grant resource locations after $t_3$, where N is greater than 1, or at least one configured grant resource location after $t_3$, etc., may be determined as the target resource location. A specific implementation may refer to the relevant description above, which will not be repeated here.

For another example, a time period from $t_3$ to $t_2$, where $t_3$ is later than $t_1$, in this case, a 1-st configured grant resource location after $t_2$, or first N configured grant resource locations after $t_2$, where N is greater than 1, or at least one configured grant resource location after $t_2$, etc., may be determined as the target resource location. A specific implementation may refer to the relevant description above, which will not be repeated here.

For yet another example, a time period from $t_3$ to $t_4$, where $t_4$ is earlier than $t_2$, $t_3$ is later than $t_1$, in this case, a 1-st configured grant resource location after $t_4$, or first N configured grant resource locations after $t_4$, where N is greater than 1, or at least one configured grant resource location after $t_4$, etc., may be determined as the target resource location. A specific implementation may refer to the relevant description above, which will not be repeated here.

Embodiment 1-4: the first time period is a time period from when the configured grant timer is started to when the configured grant timer expires.

In an embodiment, assuming that start time instant of a configured grant timer is $t_1$ and end time instant is $t_2$, then the first time period may be a time period from the start time instant $t_1$ to the end time instant $t_2$.

In this case, a 1-st configured grant resource location after $t_2$, or first N configured grant resource locations after $t_2$, where N is greater than 1, or at least one configured grant resource location after $t_2$, etc., may be determined by the terminal device as the target resource location. A specific implementation may refer to the relevant description above, which will not be repeated here.

If the terminal device has not received a scheduling instruction for the deprioritized data from the network device during the time period from when the configured grant timer is started to when the configured grant timer expires, the terminal device may perform retransmission of the deprioritized data by itself at the 1-st configured grant resource location after the configured grant timer expires, which is beneficial to avoid the conflict between the retransmission scheduling of the deprioritized data by a network device and the retransmission of the deprioritized data by the terminal device itself and reduce the complexity of terminal equipment processing, and in a condition that prioritizing the retransmission scheduling of the deprioritized data by the network device, further ensure a timely retransmission of the deprioritized data, reduce a transmission delay and is beneficial to meet a transmission need of a service with a high delay requirement.

Embodiment 1-5: the first time period is a time period from when the configured grant timer is started to a 1-st configured grant resource location after the configured grant timer expires.

As a specific example, the 1-st configured grant resource location after the configured grant timer expires may be determined as the target resource location for retransmitting the deprioritized data.

If the terminal device has not received a scheduling instruction for the deprioritized data from the network device during the time period from when the configured grant timer is started to when the configured grant timer expires, the terminal device may perform retransmission of the deprioritized data by itself at the 1-st configured grant resource location after the configured grant timer expires, which is beneficial to avoid the conflict between the retransmission scheduling of the deprioritized data by a network device and the retransmission of the deprioritized data by the terminal device itself, and in a condition that prioritizing the retransmission scheduling of the deprioritized data by the network device, further ensure a timely retransmission of the deprioritized data, reduce a transmission delay and is beneficial to meet a transmission need of a service with a high delay requirement.

It should be understood that in the Embodiment 1-5, the target resource location may be other resource locations described above, which is not limited in the embodiments of the present application. For example, any configured grant resource location after the 1-st configured grant resource location after the configured grant timer expires, or, at least one configured grant resource location starting from the 1-st configured grant resource after the configured grant timer expires, or, N configured grant resource locations starting from the 1-st configured grant resource after the configured grant timer expires, etc., where N is an integer greater than 1.

Embodiment 1-6: the first time period is a time period from when the configured grant timer is started to an M-th configured grant resource location after the configured grant timer expires, where M is greater than 1.

As a specific example, the target resource location for retransmitting the deprioritized data may be the M-th configured grant resource location after the configured grant timer expires.

In other embodiments, the target resource location may be other resource locations described above, which is not limited in the embodiments of the present application. For example, any configured grant resource location after the M-th configured grant resource location after the configured grant timer expires, or, at least two configured grant resource locations starting from the M-th configured grant resource, or, N configured grant resource locations starting from the M-th configured grant resource, etc., where N is greater than 1.

Embodiment 1-7: the first time period is a time period from when the configured grant timer is started to a third time instant after the configured grant timer expires.

In an embodiment, the time period from when the configured grant timer expires to the third time instant may be predefined or configured by a network device. Therefore, the location of the third time instant may be determined according to a start time instant of the configured grant timer, a time duration of the configured grant timer and a time duration from when the configured grant timer expires to the third time instant.

In the Embodiment 1-7, as a specific example, the target resource location for retransmitting the deprioritized data may be a 1-st configured grant resource location after the third time instant.

In other embodiments, the target resource location may be other resource locations described above, which is not limited in the embodiments of the present application. For example, any configured grant resource location after the 1-st configured grant resource location after the third time instant, or, at least two configured grant resource locations starting from the third time instant, or, first N configured grant resource locations starting from the third time instant, etc., where N is greater than 1.

Embodiment 1-8: the first time period is a time period from when the configured grant timer is started to a 1-st configured grant resource location after the third time instant after the configured grant timer expires.

Here, a method for determining the location of the third time instant may refer to the relevant implementation above, which will not be repeated here.

In the Embodiment 1-8, as a specific example, the target resource location for retransmitting the deprioritized data may be a 1-st configured grant resource location after the third time instant.

In other embodiments, the target resource location may be other resource locations described above, which is not limited in the embodiments of the present application. For example, any configured grant resource location after the 1-st configured grant resource location after the third time instant, or, at least two configured grant resource locations starting from the third time instant, or, first N configured grant resource locations starting from the third time instant, etc., where N is greater than 1.

Embodiment 1-9: the first time period is a time period from when the configured grant timer is started to an M-th configured grant resource location after the third time instant after the configured grant timer expires, where M is greater than 1.

In an embodiment, a method for determining the location of the third time instant may refer to the relevant implementation above, which will not be repeated here.

In the Embodiment 1-9, as a specific example, the target resource location for retransmitting the deprioritized data may be an M-th configured grant resource location after the third time instant.

In some other embodiments, the target resource location may be other resource locations described above, which is not limited in the embodiments of the present application. For example, any configured grant resource location after the M-th configured grant resource location after the third time instant, or, at least two configured grant resource locations starting from the M-th configured grant resource location, or, first N configured grant resource locations starting from the M-th configured grant resource location, etc., where N is greater than 1.

Embodiment 1-10: the first time period is a time period from when the configured grant timer expires to a 1-st configured grant resource location after the configured grant timer expires.

In the Embodiment 1-10, as a specific example, the target resource location for retransmitting the deprioritized data may be a 1-st configured grant resource location after the configured grant timer expires.

In other embodiments, the target resource location may be other resource locations described above, which is not limited in the embodiments of the present application. For example, any configured grant resource location after the configured grant timer expires, or, at least two configured grant resource locations after the configured grant timer expires, or, first N configured grant resource locations starting from the 1-st configured grant resource location, etc., where N is greater than 1.

In a condition that a network device does not schedule a retransmission of the deprioritized data, the terminal device may perform retransmission of the deprioritized data by itself at the 1-st configured grant resource location after the configured grant timer expires, which is beneficial to avoid the conflict between the retransmission scheduling of the deprioritized data by the network device and the retransmission of the deprioritized data by the terminal device itself, and ensure a timely retransmission of the deprioritized data, reduce a transmission delay and is beneficial to meet a transmission need of a service with a high delay requirement.

Embodiment 1-11: the first time period is a time period from when the configured grant timer expires to an M-th configured grant resource location after the configured grant timer expires, where M is greater than 1.

In the Embodiment 1-11, as a specific example, the target resource location for retransmitting the deprioritized data may be an M-th configured grant resource location after the configured grant timer expires.

In other embodiments, the target resource location may be other resource locations described above, which is not limited in the embodiments of the present application. For example, any configured grant resource location after the M-th configured grant resource location, or, at least two configured grant resource locations after the M-th configured grant resource location, or, first N configured grant resource locations starting from the M-th configured grant resource location, etc., where N is greater than 1.

Embodiment 1-12: the first time period is a time period from when the configured grant timer expires to a third time instant after the configured grant timer expires.

In an embodiment, a method for determining the location of the third time instant may refer to the relevant implementation above, which will not be repeated here.

In the Embodiment 1-12, as a specific example, determined as the target resource location for retransmitting the deprioritized data may be a 1-st configured grant resource location after the third time instant.

In other embodiments, the target resource location may be other resource locations described above, which is not limited in the embodiments of the present application. For example, any configured grant resource location after the 1-st configured grant resource location after the third time instant, or, at least two configured grant resource locations starting from the third time instant, or, first N configured grant resource locations starting from the third time instant, etc., where N is greater than 1.

Embodiment 1-13: the first time period is a time period from when the configured grant timer expires to a 1-st configured grant resource location after a third time instant after the configured grant timer expires.

In an embodiment, a method for determining the location of the third time instant may refer to a relevant implementation above, which will not be repeated here.

In the Embodiment 1-13, as a specific example, the target resource location for retransmitting the deprioritized data may be the 1-st configured grant resource location after the third time instant.

In other embodiments, the target resource location may be other resource locations described above, which is not limited in the embodiments of the present application. For example, any configured grant resource location after the 1-st configured grant resource location after the third time instant, or, at least two configured grant resource locations starting from the third time instant, or, first N configured grant resource locations starting from the third time instant, etc., where N is greater than 1.

Embodiment 1-14: the first time period is a time period from when the configured grant timer expires to an M-th configured grant resource location after a third time instant after the configured grant timer expires, where M is greater than 1.

In an embodiment, a method for determining the location of the third time instant may refer to the relevant implementation above, which will not be repeated here.

In the Embodiment 1-14, as a specific example, the target resource location for retransmitting the deprioritized data may be the M-th configured grant resource location after the third time instant.

In other embodiments, the target resource location may be other resource locations described above, which is not limited in the embodiments of the present application. For example, any configured grant resource location after the M-th configured grant resource location after the third time instant, or, at least two configured grant resource locations starting from the M-th configured grant resource location, or, first N configured grant resource locations starting from the M-th configured grant resource location, etc., where N is greater than 1.

Therefore, according to the wireless communication method of the embodiment of the present application, the terminal device may determine whether to retransmit the deprioritized data according to the scheduling situation of the deprioritized data after the configured grant timer is started, which is beneficial to avoid the conflict between the retransmission scheduling of the deprioritized data by the network device and the retransmission of the deprioritized data by the terminal device itself, and ensure a timely retransmission of the deprioritized data in a condition that the deprioritized data is not scheduled by the network device, reduce a transmission delay and is beneficial to meet a transmission need of a service with a high delay requirement.

Embodiment 2:

In some embodiments, a transmission situation of the deprioritized data may include at least one of the following: whether the deprioritized data is transmitted, whether the deprioritized data is initial transmitted, whether the deprioritized data is retransmitted, etc.

As an example, whether the deprioritized data is transmitted may be determined according to whether the deprioritized data is stored in a HARQ process where the deprioritized data is located, for example, if the deprioritized data is not stored in the HARQ process where the deprioritized data is located, it may be determined that the deprioritized data is transmitted; or, if the HARQ process where the deprioritized data is located is empty, it may be determined that the deprioritized data is transmitted, otherwise, it may be determined that the deprioritized data is not transmitted.

As another example, whether the deprioritized data is transmitted may be determined according to whether an NDI in a HARQ process where the deprioritized data is located is inverted, for example, if the NDI in the HARQ process where the deprioritized data is located is inverted, it may be determined that the deprioritized data is transmitted; or, if the NDI in the HARQ process where the deprioritized data is located is not inverted, it may be determined that the deprioritized data is not transmitted or needs to be retransmitted.

As yet another example, whether the deprioritized data is transmitted may be determined according to whether the deprioritized data is scheduled, for example, if the deprioritized data is scheduled, it may be determined that the deprioritized data is transmitted.

It should be understood that in the present embodiment, the transmission of the deprioritized data may be due to a retransmission scheduling of the network device, or the transmission of the deprioritized data may also be due to a transmission by the terminal device itself, which is not limited by the embodiment of the present application. The deprioritized data is retransmitted only in a condition that the deprioritized data is not transmitted, in a condition that the deprioritized data is transmitted, the deprioritized data is not retransmitted, which is beneficial to avoid wasting of system resources.

In the embodiment of the present application, the terminal device may determine whether to retransmit the deprioritized data according to whether the deprioritized data is transmitted during a second time period after a configured grant timer is started.

The implementation of the configured grant timer may refer to the relevant description in the Embodiment 1, which will not be repeated here.

For example, if the deprioritized data is not transmitted during a second time period after the configured grant timer is started, in this case, the terminal device may retransmit the deprioritized data, that is, the deprioritized data may be retransmitted using the aforementioned manner 2.

For another example, if the deprioritized data is transmitted during a second time period after the configured grant timer is started, in this case, the terminal device may not have to retransmit the deprioritized data.

Therefore, the embodiment of the present application may retransmit the deprioritized data in a condition that the deprioritized data is not transmitted, on the one hand, it may avoid the conflict between the network scheduling retransmission of the deprioritized data and the terminal device retransmitting the deprioritized data by itself, on the other hand, it may prioritize the network scheduling retransmission of the deprioritized data, and at the same time, it may reduce a loss probability of the deprioritized data and ensure a reliable transmission of the deprioritized data.

Further, in a condition that it is determined to retransmit the deprioritized data, the terminal device may retransmit the deprioritized data on a configured grant resource, for example, the terminal device may retransmit the deprioritized data at one or more configured grant resource locations after the second time period.

As an example, the terminal device may retransmit the deprioritized data on at least one configured grant resource location after the second time period, the at least one configured grant resource location may be any configured grant resource location after the second time period.

As another example, the terminal device may retransmit the deprioritized data on first N configured grant resource locations after the second time period, or in other words, N configured grant resource locations starting from a 1-st configured grant resource location after the second time period, or in other words, at least one configured grant resource location starting from the 1-st configured grant resource location after the second time period, where N is a positive integer, which is beneficial to ensure a timely transmission of the deprioritized data.

As a specific example, the terminal device may retransmit the deprioritized data at a 1-st configured grant resource location after the second time period, which is beneficial to ensure a timely transmission of the deprioritized data.

In the following, in combination with a specific embodiment, a specific location of the second time period and a corresponding target resource location are described.

Embodiment 2-1: the second time period is a time period from when the configured grant timer is started to a 1-st configured grant resource location after the configured grant timer is started.

Embodiment 2-2: the second time period is a time period from when the configured grant timer is started to an M-th configured grant resource location after the configured grant timer is started, where M is an integer greater than 1.

Embodiment 2-3: the second time period is at least part of a time period from when the configured grant timer is started to when the configured grant timer expires.

Embodiment 2-4: the second time period is a time period from when the configured grant timer is started to when the configured grant timer expires.

Embodiment 2-5: the second time period is a time period from when the configured grant timer is started to a 1-st configured grant resource location after the configured grant timer expires.

Embodiment 2-6: the second time period is a time period from when the configured grant timer is started to an M-th configured grant resource location after the configured grant timer expires, where M is greater than 1.

Embodiment 2-7: the second time period is a time period from when the configured grant timer is started to a third time instant after the configured grant timer expires.

Embodiment 2-8: the second time period is a time period from when the configured grant timer is started to a 1-st configured grant resource location after a third time instant after the configured grant timer expires.

Embodiment 2-9: the second time period is a time period from when the configured grant timer is started to an M-th configured grant resource location after a third time instant after the configured grant timer expires, where M is greater than 1.

Embodiment 2-10: the second time period is a time period from when the configured grant timer expires to a 1-st configured grant resource location after the configured grant timer expires.

Embodiment 2-11: the second time period is a time period from when the configured grant timer expires to an M-th configured grant resource location after the configured grant timer expires, where M is greater than 1.

Embodiment 2-12: the second time period is a time period from when the configured grant timer expires to a third time instant after the configured grant timer expires.

Embodiment 2-13: the second time period is a time period from when the configured grant timer expires to a 1-st configured grant resource location after a third time instant after the configured grant timer expires.

Embodiment 2-14: the second time period is a time period from when the configured grant timer expires to an M-th configured grant resource location after a third time instant after the configured grant timer expires, where M is greater than 1.

It should be understood that Embodiment 2-1 to Embodiment 2-14 correspond to Embodiment 1-1 to Embodiment 1-14 in Embodiment 1, respectively, the specific implementation of which may refer to the relevant description in the embodiments above, which will not be repeated here.

Therefore, according to a wireless communication method of the embodiment of the present application, the terminal device may determine whether to retransmit deprioritized data according to a transmission situation of the deprioritized data after a configured grant timer is started, which is beneficial to avoid the conflict between the retransmission scheduling of the deprioritized data by the network device and the retransmission of the deprioritized data by the terminal device itself, at the same time, in a condition that the network device does not schedule the deprioritized data, it is beneficial to ensure a timely retransmission of the deprioritized data, reduce a transmission delay, and is beneficial to meet a transmission need of a service with a high delay requirement.

Embodiment 3:

In some embodiments, the processing situation of the deprioritized data may be whether the deprioritized data is cleared, or, whether the deprioritized data is flushed by the subsequent data to be transmitted, whether a HARQ process corresponding to the deprioritized data is cleared, etc.

For example, if the HARQ process corresponding to the deprioritized data is cleared, it may be determined that the deprioritized data is cleared, or, if the data stored in the HARQ process where the deprioritized data is located is not the deprioritized data, then it is determined that the deprioritized data is cleared.

It should be understood that in the present embodiment, if deprioritized data is cleared, it may be considered that the deprioritized data is transmitted, or the deprioritized data is scheduled, in this case, it may not have to retransmit the deprioritized data, otherwise, it is considered that the deprioritized data has not been transmitted, or the deprioritized data has not been scheduled, therefore, the deprioritized data may be retransmitted.

In the embodiment of the present application, the terminal device may determine whether to retransmit the deprioritized data according to whether the deprioritized data is cleared during a third time period after a configured grant timer is started.

The implementation of the configured grant timer may refer to the relevant description in the Embodiment 1, which will not be repeated here.

For example, if the deprioritized data is not cleared during the third time period after the configured grant timer is started, in this case, the terminal device may retransmit the deprioritized data, that is, the deprioritized data may be retransmitted using the aforementioned manner 2.

For another example, if the deprioritized data is cleared during the third time period after the configured grant timer is started, in this case, the terminal device may not have to retransmit the deprioritized data.

Therefore, the embodiment of the present application may retransmit the deprioritized data in a condition that the deprioritized data is not transmitted by a network terminal, on the one hand, it may avoid the conflict between the network scheduling retransmission of the deprioritized data and the terminal device retransmitting the deprioritized data by itself, on the other hand, it may prioritize the network scheduling retransmission of the deprioritized data, and at the same time, it may reduce a loss probability of the deprioritized data and ensure a reliable transmission of the deprioritized data.

Further, in a condition that it is determined to retransmit the deprioritized data, the terminal device may retransmit the deprioritized data on a configured grant resource, for example, the terminal device may retransmit the deprioritized data at one or more configured grant resource locations after the third time period.

As an example, the terminal device may retransmit the deprioritized data on at least one configured grant resource location after the third time period, the at least one configured grant resource location may be any configured grant resource location after the third time period.

As another example, the terminal device may retransmit the deprioritized data on first N configured grant resource locations after the third time period, or in other words, N configured grant resource locations starting from a 1-st configured grant resource location after the third time period, or in other words, at least one configured grant resource location starting from the 1-st configured grant resource location after the third time period, where N is a positive integer, which is beneficial to ensure a timely transmission of the deprioritized data.

As a specific example, the terminal device may retransmit the deprioritized data at a 1-st configured grant resource location after the third time period, which is beneficial to ensure a timely transmission of deprioritized data.

In the following, in combination with a specific embodiment, a specific location of the third time period and a corresponding target resource location are described.

Embodiment 3-1: the third time period is a time period from when the configured grant timer is started to a 1-st configured grant resource location after the configured grant timer is started.

Embodiment 3-2: the third time period is a time period from when the configured grant timer is started to an M-th configured grant resource location after the configured grant timer is started, where M is an integer greater than 1.

Embodiment 3-3: the third time period is at least part of a time period from when the configured grant timer is started to when the configured grant timer expires.

Embodiment 3-4: the third time period is a time period from when the configured grant timer is started to when the configured grant timer expires.

Embodiment 3-5: the third time period is a time period from when the configured grant timer is started to a 1-st configured grant resource location after the configured grant timer expires.

Embodiment 3-6: the third time period is a time period from when the configured grant timer is started to an M-th configured grant resource location after the configured grant timer expires, where M is greater than 1.

Embodiment 3-7: the third time period is a time period from when the configured grant timer is started to a third time instant after the configured grant timer expires.

Embodiment 3-8: the third time period is a time period from when the configured grant timer is started to a first configured grant resource location after a third time instant after the configured grant timer expires.

Embodiment 3-9: the third time period is a time period from when the configured grant timer is started to an M-th configured grant resource location after a third time instant after the configured grant timer expires, where M is greater than 1.

Embodiment 3-10: the third time period is a time period from when the configured grant timer expires to a 1-st configured grant resource location after the configured grant timer expires.

Embodiment 3-11: the third time period is a time period from when the configured grant timer expires to an M-th configured grant resource location after the configured grant timer expires, where M is greater than 1.

Embodiment 3-12: the third time period is a time period from when the configured grant timer expires to a third time instant after the configured grant timer expires.

Embodiment 3-13: the third time period is a time period from when the configured grant timer expires to a 1-st configured grant resource location after a third time instant after the configured grant timer expires.

Embodiment 3-14: the third time period is a time period from when the configured grant timer expires to an M-th configured grant resource location after a third time instant after the configured grant timer expires, where M is greater than 1.

It should be understood that Embodiment 3-1 to Embodiment 3-14 correspond to Embodiment 1-1 to Embodiment 1-14 in Embodiment 1, respectively, the specific implementation of which may refer to the relevant description in the embodiments above, which will not be repeated here.

Embodiment 4:

In the embodiment 4, the terminal device may directly retransmit the deprioritized data on a specific configured grant resource without determining a scheduling situation, a transmission situation, or a processing situation of the deprioritized data. For example, the terminal device may retransmit the deprioritized data on a first configured grant resource after a configured grant timer is started.

In some embodiments, the first configured grant resource location is one of the following:
- at least one configured grant resource location after the configured grant timer is started;
- a 1-st configured grant resource location after the configured grant timer is started;
- first N configured grant resource locations after the configured grant timer is started, where N is an integer greater than 1;
- at least one configured grant resource location after a first time instant after the configured grant timer is started;
- a 1-st configured grant resource location after the first time instant after the configured grant timer is started;
- first N configured grant resource locations after the first time instant after the configured grant timer is started, where N is an integer greater than 1;
- at least one configured grant resource location after the configured grant timer expires;
- a 1-st configured grant resource location after the configured grant timer expires; first N configured grant resource locations after the configured grant timer expires, where N is an integer greater than 1; at least one configured grant resource location after a second time instant after the configured grant timer expires;
- a 1-st configured grant resource location after the second time instant after the configured grant timer expires;
- first N configured grant resource locations after the second time instant after the configured grant timer expires, where N is a positive integer greater than 1.

Here, the specific implementation of the first configured grant resource may refer to the specific implementation of Embodiment 1-1 to Embodiment 1-14 above, which will not be repeated here.

In an embodiment, the first time instant may be predefined or configured by a network device.

In an embodiment, the second time instant may also be predefined or configured by a network device.

In the embodiment of the present application, the method 200 may further include:
the terminal device receives configuration information sent by a network device, where the configuration information is used to configure at least one of the following:
a period of the configured grant resource; an identity of the configured grant resource; a hybrid automatic repeat request (HARQ) process number corresponding to the configured grant resource; a configured grant timer for the HARQ process of the configured grant resource; an automatic retransmission activation indication, where the automatic retransmission activation indication is used to indicate the terminal device to use the configured grant resource to retransmit the deprioritized data, or to indicate whether the terminal device determines, according to the first information, whether to retransmit the deprioritized data on the configured grant resource and/or determines the target resource location for retransmitting the deprioritized data.

In some embodiments, the terminal device may determine, according to the automatic retransmission activation indication, whether to retransmit the deprioritized data using the manners in the aforementioned embodiments, for example, in a condition that the configuration information includes the automatic retransmission activation indication, the terminal device may use the manners in the aforementioned embodiments to retransmit the deprioritized data, or the automatic retransmission activation indication may be used to indicate whether the terminal device uses the aforementioned manner 2 to retransmit the deprioritized data. In this case, the terminal device may use the manners in the aforementioned embodiments to perform the retransmission of the deprioritized data when the automatic retransmission activation indication indicates to use the aforementioned manner 2 to retransmit the deprioritized data.

In some embodiments, the automatic retransmission activation indication may be for the configured grant resource, that is, the data scheduled for transmission on the configured grant resource may be configured to be retransmitted in the manners in the aforementioned embodiments. That is, the deprioritized data may be the data scheduled for transmission on the configured grant resource.

In some other embodiments, the automatic retransmission activation indication may be for a specific configured grant resource, that is, the data scheduled for transmission on the specific configured grant resource may be configured to be retransmitted in the manners in the aforementioned embodiments. That is, the deprioritized data may be the data scheduled for transmission on the specific configured grant resource.

In some other embodiments, the automatic retransmission activation indication may be for a current configured grant resource, that is, the data scheduled for transmission on the current configured grant resource may be configured to be retransmitted in the manners in the aforementioned embodiments. That is, the deprioritized data may be the data scheduled for transmission on the currently configured grant resource.

In some other embodiments, the automatic retransmission activation indication may be for a specific HARQ process of the configured grant resource, that is, the data transmitted using the specific HARQ process of the configured grant resource may be configured to be retransmitted in the manners in the aforementioned embodiments. That is, the deprioritized data may be the data using the specific HARQ process of the configured grant resource.

In some other embodiments, the automatic retransmission activation indication may be for a specific HARQ process, the specific HARQ process may correspond to one configured grant resource, or may also correspond to multiple configured grant resources. That is, the data transmitted using the specific HARQ process may be configured to be retransmitted in the manners in the aforementioned embodiments. That is, the deprioritized data may be the data using the specific HARQ process.

In other embodiments, the automatic retransmission activation indication may be for a specific terminal device, that is, the deprioritized data on the specific terminal device may be configured to be retransmitted in the manners in the aforementioned embodiments.

That is, the deprioritized data may be the deprioritized data to be transmitted on the specific terminal device, or the deprioritized data stored on the specific terminal device.

It should be understood that in the embodiment of the present application, a HARQ process of the configured grant resource and a HARQ process of the deprioritized data may be the same or different, which is not limited in the embodiments of the present application.

It should be understood that in the embodiment of the present application, a CG identity of the configured grant resource and a CG identity of the deprioritized data may be the same or different, which is not limited in the embodiments of the present application.

It should be understood that in the embodiment of the present application, the network device may also perform retransmission scheduling on the deprioritized data when a terminal device does not retransmit the deprioritized data.

For example, if the network device does not receive the deprioritized data from the terminal device within a period of time, the network device may perform retransmission scheduling on the deprioritized data, specifically, a scheduling instruction may be sent to the terminal device to schedule a retransmission of the deprioritized data. The specific implementation may refer to the relevant description above, which will not be repeated here.

In the following, in combination with the specific embodiments shown in FIG. 3 and FIG. 4, a wireless communication method of the embodiment of the present application will be described in detail.

Firstly, the network device may configure a CG resource for the terminal device, in an embodiment, configuration information of the CG resource may include at least one of the following:

a period of the CG resource, for example, one slot;

an identity (ID) of the CG resource, for example, the ID may be 1;

a configured grant timer (configuredGrantTimer) of a HARQ process of the CG resource, for example, a length of the timer may be 3, which indicates 3 slots, or 3 CG periods in length;

a HARQ process number corresponding to the CG resource, for example, the HARQ process number may be 2, 3, 4;

an automatic retransmission activation indication.

In an embodiment, the automatic retransmission activation indication may also be predefined or determined by a terminal device itself.

Further, a network device indicates to activate a CG resource with a CG identity 1 through the downlink control information (DCI). After that, the terminal device uses this CG resource for performing data transmission.

At a certain time instant, the network device performs data transmission on a DG resource through DCI scheduling, the DG resource overlaps the CG resource, and HARQ processes of the DG resource and the CG resource are different, for example, the DG resource corresponds to a HARQ process 1, and the CG resource corresponds to a HARQ process 2.

Further, the terminal device may perform intra-UE prioritization, determine to preferentially transmit data on the DG resource, packet the data to be transmitted on the DG resource to generate MAC PDU2. The terminal device may also packet the data to be transmitted on the CG resource to generate MAC PDU1 (that is, a deprioritized MAC PDU). The terminal device saves MAC PDU1 in a buffer corresponding to HARQ process 1, saves MAC PDU2 in a buffer corresponding to HARQ process 2, and starts a CG timer corresponding to the HARQ process 2.

Thereafter, the terminal device transmits the prioritized MAC PDU1.

Within a period of time after the configured grant timer is started, the terminal device determines to automatically retransmit the deprioritized MAC PDU2 according to whether the deprioritized MAC PDU2 is scheduled, is transmitted or is cleared. A specific implementation may refer to the aforementioned embodiments.

As a preferred embodiment, as shown in FIG. 3, if the deprioritized MAC PDU2 is not scheduled, not transmitted, or not cleared during a time period from when the CG timer is started to a 1-st configured grant resource location after the CG timer is started, the terminal device may use the 1-st configured grant resource to transmit the deprioritized MAC PDU2, which is beneficial to ensure a timely transmission of the deprioritized data, and reduce a transmission delay.

Figure 4:
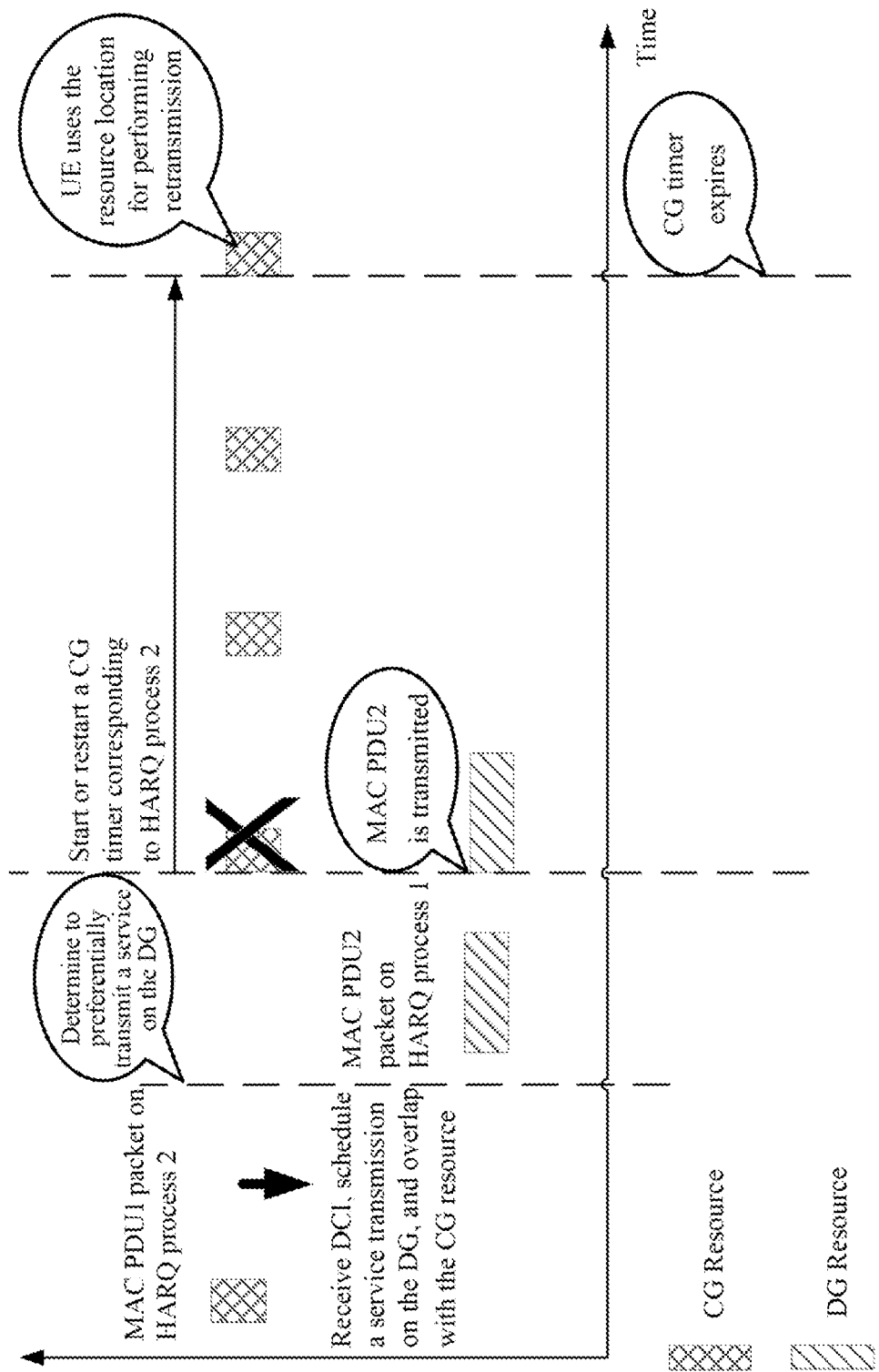
FIG. 4 is a schematic diagram of transmitting deprioritized data according to another specific embodiment.

As another preferred embodiment, as shown in FIG. 4, if the deprioritized MAC PDU2 is not scheduled, not transmitted, or not cleared during a time period from when the CG timer is started to when the CG timer expires, the terminal device may use a 1-st configured grant resource after the CG timer expires to transmit the deprioritized MAC PDU2, which is beneficial to ensure a timely transmission of the deprioritized data, and reduce a transmission delay.

The wireless communication method according to the embodiment of the present application is described in detail above in combination with FIGS. 2 to 4 from the perspective of the terminal device, and wireless communication method according to another embodiment of the present application is described in detail below in combination with FIGS. 5 and 6 from the perspective of the network device. It should be understood that the description on the side of the network device corresponds to the description on the side of the terminal device, and similar descriptions may be found above and will not be repeated here to avoid repetition.

FIG. 5 is a schematic flowchart of a wireless communication method 300 according to another embodiment of the present application, the method 300 may be executed by a network device in the communication system shown in FIG. 1. As shown in FIG. 5, the method 300 includes the following content:

S310, if a network device receives deprioritized data at a specific configured grant resource location, the network device does not perform retransmission scheduling on the deprioritized data, where the specific resource location is determined according to first information, and the first information includes at least one of the following:

a running state of a configured grant timer; a configured grant resource location after the configured grant timer is started; whether the deprioritized data is scheduled during a first time period after the configured grant timer is started; whether the deprioritized data is transmitted during a second time period after the configured grant timer is started; whether the deprioritized data is cleared during a third time period after the configured grant timer is started.

It should be understood that the specific configured grant resource location here may be the target resource location for the terminal device in the method 200 to retransmit the deprioritized data, if the network device receives the deprioritized data at the target resource location, it may consider that the deprioritized data is retransmitted by the terminal device itself. In this case, the network device may not have to schedule the retransmission of the deprioritized data, which is beneficial to avoid waste of system resources and improve system performance.

FIG. 6 is a schematic flowchart of a wireless communication method 400 according to another embodiment of the present application, the method 400 may be executed by a network device in the communication system shown in FIG. 1. As shown in FIG. 6, the method 400 includes the following content:

S410, a network device schedules and retransmits deprioritized data according to a running state of a configured grant timer.

In an embodiment, the network device may also schedule and retransmit the deprioritized data according to a running state of the configured grant timer in case of a resource conflict.

In an embodiment, the network device may determine that a resource conflict occurs when one of the following situations occurs:
1. when the deprioritized data exists;
2. when a CG resource that overlaps with a DG resource exists, that is, after the DG resource is scheduled, there is an available CG resource, and the CG resource and the DG resource at least partially overlaps in time-domain;
3. when a DG resource that overlaps with a CG resource exists, that is, after the CG resource, the DG resource is further scheduled, and the DG resource and the CG resource at least partially overlaps in time-domain;
4. when a DG resource that overlaps with a HARQ process using a CG resource exists, that is, there is a conflict between the CG resource and the DG resource, the conflict between the CG resource and the DG resource may be any of the foregoing 2 or 3, and the HARQ process associated with the DG resource is the same as the HARQ process associated with the CG resource;
5. when another CG resource that overlaps with a CG resource exists, that is, a resource conflict occurs between the two CG resources;
or, it may also be other situations where a resource conflict occurs. The terminal device may also determine whether a resource conflict occurs according to the above determination method.

In an embodiment, if the network device further indicates a resource A used for automatically retransmitting the deprioritized data after scheduling a DG resource, the technical solutions of the embodiments of the present application may also be extended to a condition that using the resource A to automatically retransmit the deprioritized data associated with the DG resource when the DG resource has a resource conflict with another resource (for example, a DG resource or a CG resource), that is, if the network device further indicates that resource A may be used for transmitting the deprioritized data after scheduling the DG resource for transmitting the deprioritized data, then in a condition that the DG resource has a resource conflict with another resource, the terminal device may use the resource A to retransmit the deprioritized data associated with the DG resource.

In the embodiment of the present application, the network device retransmits deprioritized data according to a running state of a configured grant timer, includes at least one of the following:

the network device retransmits the deprioritized data during a first time period after the configured grant timer is started;

the network device retransmits the deprioritized data after the first time period after the configured grant timer is started;

the network device retransmits the deprioritized data after the configured grant timer is started;

the network device retransmits the deprioritized data after the configured grant timer expires.

In the present embodiment, the first time period is one of the following:

a time period from when the configured grant timer is started to a 1-st configured grant resource location after the configured grant timer is started;

a time period from when the configured grant timer is started to an M-th configured grant resource location after the configured grant timer is started, where M is an integer greater than 1;

a time period from when the configured grant timer is started to when the configured grant timer expires;

at least part of the time period from when the configured grant timer is started to when the configured grant timer expires;

a time period from when the configured grant timer is started to a 1-st configured grant resource location after the configured grant timer expires;

a time period from when the configured grant timer is started to an M-th configured grant resource location after the configured grant timer expires, where M is an integer greater than 1;

a time period from when the configured grant timer expires to a first configured grant resource location after the configured grant timer expires;

a time period from when the configured grant timer expires to an M-th configured grant resource location after the configured grant timer expires, where M is an integer greater than 1;

a time period from when the configured grant timer is started to a first time instant after the configured grant timer expires;

a time period from when the configured grant timer is started to a first configured grant resource location after the first time instant after the configured grant timer expires;

a time period from when the configured grant timer is started to an M-th configured grant resource location after the first time instant after the configured grant timer expires, where M is an integer greater than 1;

a time period from when the configured grant timer expires to the first time instant after the configured grant timer expires;

a time period from when the configured grant timer expires to a first configured grant resource location after the first time instant after the configured grant timer expires;

a time period from when the configured grant timer expires to an M-th configured grant resource location after the first time instant after the configured grant timer expires, where M is an integer greater than 1.

A specific implementation may be referred to the implementation of the terminal device side, which will not be repeated here.

The method embodiments of the present application is described in detail above in combination with FIGS. 2 to 6, and the device embodiments of the present application is described in detail below in combination with FIGS. 7 to 11. It should be understood that the device embodiments and the method embodiments correspond to each other, and similar descriptions may be referred to the method embodiments.

FIG. 7 illustrates a schematic block diagram of a terminal device 500 according to an embodiment of the present application. As shown in FIG. 7, the terminal device 500 includes:

a determining module 510, configured to determine, according to first information, whether to retransmit deprioritized data on a configured grant resource and/or determine a target resource location for retransmitting the deprioritized data, where the first information includes at least one of the following:

a running state of a configured grant timer;

a configured grant resource location after the configured grant timer is started;

whether the deprioritized data is scheduled during a first time period after the configured grant timer is started;

whether the deprioritized data is transmitted during a second time period after the configured grant timer is started; and, whether the deprioritized data is cleared during a third time period after the configured grant timer is started.

In some embodiments, the determining module 510 is specifically configured to:

determine a first configured grant resource location after the configured grant timer is started as the target resource location.

In some embodiments, the first configured grant resource location is one of the following:

at least one configured grant resource location after the configured grant timer is started;

a 1-st configured grant resource location after the configured grant timer is started;

first N configured grant resource locations after the configured grant timer is started, where N is an integer greater than 1;

at least one configured grant resource location after a first time instant after the configured grant timer is started;

a 1-st configured grant resource location after the first time instant after the configured grant timer is started;

first N configured grant resource locations after the first time instant after the configured grant timer is started, where N is an integer greater than 1;

at least one configured grant resource location after the configured grant timer expires;

a 1-st configured grant resource location after the configured grant timer expires; first N configured grant resource locations after the configured grant timer expires, where N is an integer greater than 1; at least one configured grant resource location after a second time instant after the configured grant timer expires;

a 1-st configured grant resource location after the second time instant after the configured grant timer expires;

first N configured grant resource locations after the second time instant after the configured grant timer expires, where N is a positive integer greater than 1.

In some embodiments, the first information includes whether the deprioritized data is scheduled during the first time period after the configured grant timer is started, the determining module 510 is further configured to:

determine to retransmit the deprioritized data if the deprioritized data is not scheduled during the first time period after the configured grant timer is started.

In some embodiments, the determining module 510 is further configured to: determine a second configured grant resource location after the first time period as the target resource location in a condition that it is determined to retransmit the deprioritized data.

In some embodiments, the second configured grant resource location is one of the following:

at least one configured grant resource location after the first time period;

first N configured grant resource locations after the first time period, where the N is a positive integer greater than 1; and, a 1-st configured grant resource location after the first time period.

In some embodiments, the first time period is one of the following:

a time period from when the configured grant timer is started to a 1-st configured grant resource location after the configured grant timer is started;

a time period from when the configured grant timer is started to an M-th configured grant resource location after the configured grant timer is started, where M is an integer greater than 1;

a time period from when the configured grant timer is started to when the configured grant timer expires;

at least part of the time period from when the configured grant timer is started to when the configured grant timer expires;

a time period from when the configured grant timer is started to a 1-st configured grant resource location after the configured grant timer expires;

a time period from when the configured grant timer is started to an M-th configured grant resource location after the configured grant timer expires, where M is an integer greater than 1;

a time period from when the configured grant timer is started to a third time instant after the configured grant timer expires;

a time period from when the configured grant timer is started to a 1-st configured grant resource location after the third time instant after the configured grant timer expires;

a time period from when the configured grant timer is started to an M-th configured grant resource location after the third time instant after the configured grant timer expires, where M is an integer greater than 1;

a time period from when the configured grant timer expires to a 1-st configured grant resource location after the configured grant timer expires;

a time period from when the configured grant timer expires to an M-th configured grant resource location after the configured grant timer expires, where M is an integer greater than 1;

a time period from when the configured grant timer expires to the third time instant after the configured grant timer expires;

a time period from when the configured grant timer expires to a 1-st configured grant resource location after the third time instant after the configured grant timer expires;

a time period from when the configured grant timer expires to an M-th configured grant resource location after the third time instant after the configured grant timer expires, where M is an integer greater than 1.

In some embodiments, the first information includes whether the deprioritized data is transmitted during the second time period after the configured grant timer is started, the determining module 510 is specifically configured to:

determine to retransmit the deprioritized data if the deprioritized data is not transmitted during the second time period after the configured grant timer is started.

In some embodiments, the determining module 510 is specifically configured to:

determine a third configured grant resource location after the second time period as the target resource location in a condition that it is determined to retransmit the deprioritized data.

In some embodiments, the third configured grant resource location is one of the following:

at least one configured grant resource location after the second time period;

first N configured grant resource locations after the second time period, where N is a positive integer; and a 1-st configured grant resource location after the second time period.

In some embodiments, the second time period is one of the following:

a time period from when the configured grant timer is started to a 1-st configured grant resource location after the configured grant timer is started;

a time period from when the configured grant timer is started to an M-th configured grant resource location after the configured grant timer is started, where M is an integer greater than 1;

a time period from when the configured grant timer is started to when the configured grant timer expires;

at least part of the time period from when the configured grant timer is started to when the configured grant timer expires;

a time period from when the configured grant timer is started to a 1-st configured grant resource location after the configured grant timer expires;

a time period from when the configured grant timer is started to an M-th configured grant resource location after the configured grant timer expires, where M is an integer greater than 1;

a time period from when the configured grant timer expires to a 1-st configured grant resource location after the configured grant timer expires;

a time period from when the configured grant timer expires to an M-th configured grant resource location after the configured grant timer expires, where M is an integer greater than 1;

a time period from when the configured grant timer is started to a fourth time instant after the configured grant timer expires;

a time period from when the configured grant timer is started to a 1-st configured grant resource location after the fourth time instant after the configured grant timer expires;

a time period from when the configured grant timer is started to an M-th configured grant resource location after the fourth time instant after the configured grant timer expires, where M is an integer greater than 1;

a time period from when the configured grant timer expires to a fourth time instant after the configured grant timer expires;

a time period from when the configured grant timer expires to a 1-st configured grant resource location after the fourth time instant after the configured grant timer expires;

a time period from when the configured grant timer expires to an M-th configured grant resource location after the fourth time instant after the configured grant timer expires, where M is an integer greater than 1.

In some embodiments, the first information includes whether the deprioritized data is cleared during the third time period after the configured grant timer is started, the determining module 510 is specifically configured to:

determine to retransmit the deprioritized data if the deprioritized data is not cleared during the third time period after the configured grant timer is started.

In some embodiments, the determining module 510 is further configured to:

determine a fourth configured grant resource location after the third time period as the target resource location in a condition that it is determined to retransmit the deprioritized data.

In some embodiments, the fourth configured grant resource location is one of the following:

at least one configured grant resource location after the third time period;

first N configured grant resource locations after the third time period, where N is a positive integer;

a 1-st configured grant resource location after the third time period.

In some embodiments, the third time period is one of the following:

a time period from when the configured grant timer is started to a 1-st configured grant resource location after the configured grant timer is started;

a time period from when the configured grant timer is started to an M-th configured grant resource location after the configured grant timer is started, where M is an integer greater than 1;

a time period from when the configured grant timer is started to when the configured grant timer expires;

at least part of the time period from when the configured grant timer is started to when the configured grant timer expires;

a time period from when the configured grant timer is started to a 1-st configured grant resource location after the configured grant timer expires;

a time period from when the configured grant timer is started to an M-th configured grant resource location after the configured grant timer expires, where M is an integer greater than 1;

a time period from when the configured grant timer expires to a 1-st configured grant resource location after the configured grant timer expires;

a time period from when the configured grant timer expires to an M-th configured grant resource location after the configured grant timer expires, where M is an integer greater than 1;

a time period from when the configured grant timer is started to a fifth time instant after the configured grant timer expires;

a time period from when the configured grant timer is started to a 1-st configured grant resource location after the fifth time instant after the configured grant timer expires;

a time period from when the configured grant timer is started to an M-th configured grant resource location after the fifth time instant after the configured grant timer expires, where M is an integer greater than 1;

a time period from when the configured grant timer expires to the fifth time instant after the configured grant timer expires;

a time period from when the configured grant timer expires to a 1-st configured grant resource location after the fifth time instant after the configured grant timer expires;

a time period from when the configured grant timer expires to an M-th configured grant resource location after the fifth time instant after the configured grant timer expires, where M is an integer greater than 1.

In some embodiments, the terminal device further includes:

a communicating module, configured to receive configuration information sent by a network device, where the configuration information is used to configure at least one of the following:

a period of the configured grant resource; an identity of the configured grant resource; a hybrid automatic repeat request (HARQ) process number corresponding to the configured grant resource; a configured grant timer for the HARQ process of the configured grant resource, an automatic retransmission activation indication, where the automatic retransmission activation indication is used to indicate the terminal device to use the configured grant resource to retransmit the deprioritized data, or to indicate whether the terminal device determines, according to the first information, whether to retransmit the deprioritized data on the configured grant resource and/or determines the target resource location for retransmitting the deprioritized data.

In some embodiments, the automatic retransmission activation indication is for the configured grant resource, or the automatic retransmission activation indication is for a specific HARQ process of the configured grant resource, or the automatic retransmission activation indication is for a specific terminal device, or the automatic retransmission activation indication is for a specific HARQ process.

In some embodiments, the deprioritized data is data to be transmitted by scheduling on the configured grant resource, data to be transmitted using the specific HARQ process, data to be transmitted using the specific HARQ process corresponding to the configured grant resource, or deprioritized data to be transmitted on the specific terminal device.

In some embodiments, the above-mentioned communicating module may be a communication interface or a transceiver, or an input-output interface to a communication chip or a system-on-a-chip. The above-mentioned determining module may be one or more processors.

It should be understood that the terminal device 500 according to the embodiment of the present application may correspond to the terminal device in the method embodiment of the present application, and the above-mentioned and other operations and/or functions of each unit in the terminal device 500 are respectively intended to implement a corresponding process of the terminal device in the method 200 shown in FIG. 2, which will not be repeated here for the sake of brevity.

Figure 8:
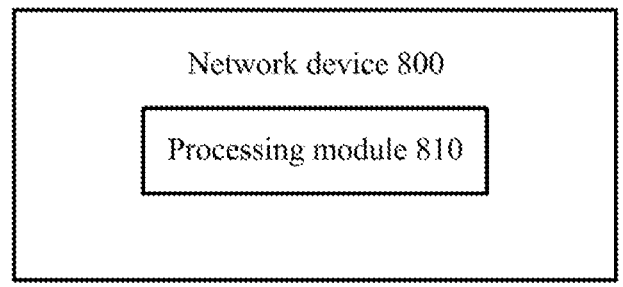
FIG. 8 is a schematic block diagram of a network device provided by an embodiment of the present application.

FIG. 8 is a schematic block diagram of a network device according to an embodiment of the present application. The network device 800 in FIG. 8 includes:

a processing module 810, configured to not perform retransmission scheduling on deprioritized data if the network device receives the deprioritized data at a specific configured grant resource location, wherein the specific configured grant resource location is determined according to first information, and the first information comprises at least one of the following:

a running state of a configured grant timer;

a configured grant resource location after the configured grant timer is started;

whether the deprioritized data is scheduled during a first time period after the configured grant timer is started;

whether the deprioritized data is transmitted during a second time period after the configured grant timer is started;

whether the deprioritized data is cleared during a third time period after the configured grant timer is started.

In some embodiments, the above-mentioned processing module may be one or more processors.

It should be understood that the network device 800 according to the embodiment of the present application may correspond to the terminal device in the method embodiment of the present application, and the above-mentioned and other operations and/or functions of each unit in the network device 800 are respectively intended to implement a corresponding process of the network device in the method 300 shown in FIG. 5, which will not be repeated here for the sake of brevity.

Figure 9:
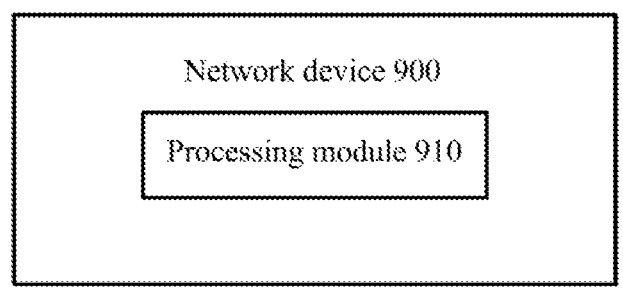
FIG. 9 is a schematic block diagram of a network device provided by another embodiment of the present application.

FIG. 9 is a schematic block diagram of a network device according to an embodiment of the present application. The network device 900 in FIG. 9 includes:

a processing module 910, configured to schedule and retransmit deprioritized data according to a running state of a configured grant timer.

In some embodiments, the processing module 910 is specifically configured to:

schedule and retransmit the deprioritized data during the first time period after the configured grant timer is started;

schedule and retransmit the deprioritized data after the first time period after the configured grant timer is started;

schedule and retransmit the deprioritized data after the configured grant timer is started; and schedule and retransmit the deprioritized data after the configured grant timer expires.

In some embodiments, the first time period is one of the following:

a time period from when the configured grant timer is started to a 1-st configured grant resource location after the configured grant timer is started;

a time period from when the configured grant timer is started to an M-th configured grant resource location after the configured grant timer is started, where M is an integer greater than 1;

a time period from when the configured grant timer is started to when the configured grant timer expires;

at least part of the time period from when the configured grant timer is started to when the configured grant timer expires;

a time period from when the configured grant timer is started to a 1-st configured grant resource location after the configured grant timer expires;

a time period from when the configured grant timer is started to an M-th configured grant resource location after the configured grant timer expires, where M is an integer greater than 1;

a time period from when the configured grant timer expires to a first configured grant resource location after the configured grant timer expires;

a time period from when the configured grant timer expires to an M-th configured grant resource location after the configured grant timer expires, where M is an integer greater than 1;

a time period from when the configured grant timer is started to a first time instant after the configured grant timer expires;

a time period from when the configured grant timer is started to a 1-st configured grant resource location after the first time instant after the configured grant timer expires;

a time period from when the configured grant timer is started to an M-th configured grant resource location after the first time instant after the configured grant timer expires, where M is an integer greater than 1;

a time period from when the configured grant timer expires to the first time instant after the configured grant timer expires;

a time period from when the configured grant timer expires to a 1-st configured grant resource location after the first time instant after the configured grant timer expires;

a time period from when the configured grant timer expires to an M-th configured grant resource location after the first time instant after the configured grant timer expires, where M is an integer greater than 1.

In some embodiments, the above-mentioned processing module may be one or more processors.

It should be understood that the network device 900 according to the embodiment of the present application may correspond to the terminal device in the method embodiment of the present application, and the above-mentioned and other operations and/or functions of each unit in the network device 900 are respectively intended to implement a corresponding process of the network device in the method 400 shown in FIG. 6, which will not be repeated here for the sake of brevity.

Figure 10:
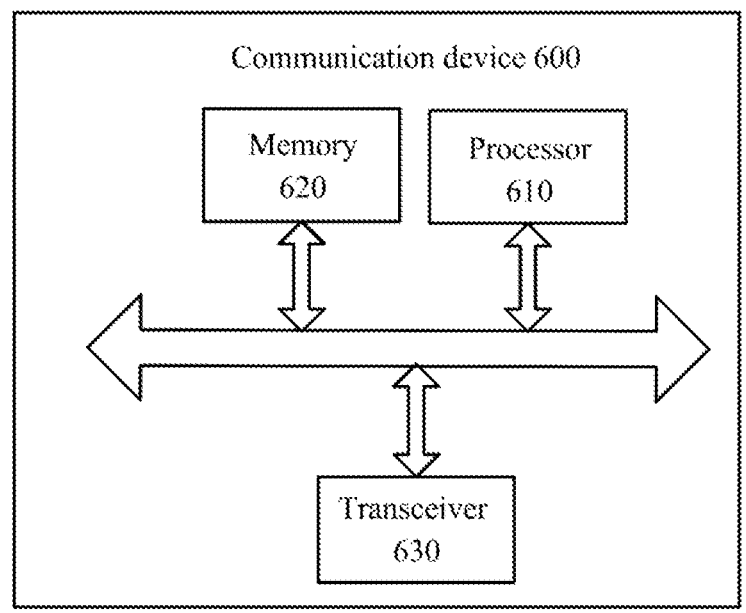
FIG. 10 is a schematic block diagram of a communication device provided by another embodiment of the present application.

FIG. 10 is a schematic block diagram of a communication device 600 provided by an embodiment of the present application. The communication device 600 shown in FIG. 10 includes a processor 610, the processor 610 may call and run a computer program from a memory to implement the method according to embodiments of the present application.

In an embodiment, as shown in FIG. 10, the communication device 600 may also include a memory 620. The processor 610 may call and run a computer program from the memory 620 to implement the method according to embodiments of the present application.

The memory 620 may be a separate component independent of the processor 610 or may be integrated into the processor 610.

In an embodiment, as shown in FIG. 10, the communication device 600 may include a transceiver 630, the processor 610 may control the transceiver 630 to communicate with other devices, specifically, may send information or data to other devices, or receive information or data sent from other devices.

The transceiver 630 may include a transmitter and a receiver. The transceiver 630 may further include an antenna, and the number of the antenna may be one or more.

In an embodiment, the communication device 600 may specifically be a network device of an embodiment of the present application, and the communication device 600 may implement a corresponding process implemented by the network device in each method according to an embodiment of the present application, which will not be repeated here for the sake of brevity.

In an embodiment, the communication device 600 may specifically be a mobile terminal/terminal device of an embodiment of the present application, and the communication device 600 may implement a corresponding process implemented by the mobile terminal/terminal device in each method according to an embodiment of the present application, which will not be repeated here for the sake of brevity.

Figure 11:
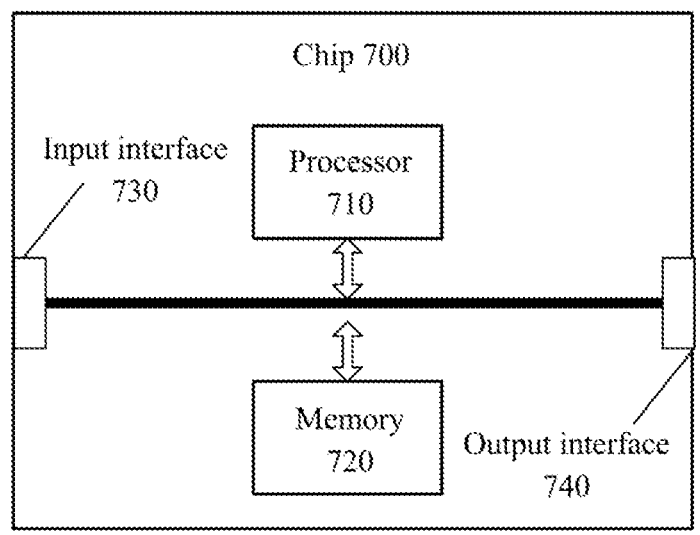
FIG. 11 is a schematic block diagram of a chip provided by an embodiment of the present application.

FIG. 11 is a schematic block diagram of a chip according to an embodiment of the present application. The chip 700 shown in FIG. 11 includes a processor 710, the processor 710 may call and run a computer program stored in a memory, to implement the method according to an embodiment of the present application.

In an embodiment, as shown in FIG. 11, the chip 700 may also include a memory 710. The processor 710 may call and run a computer program stored in the memory 720, to implement the method according to an embodiment of the present application.

The memory 720 may be a separate component independent of the processor 710 or may be integrated into the processor 710.

In an embodiment, the chip 700 may further include an input interface 730. The processor 710 may control the input interface 730 to communicate with other devices or chips, specifically, may receive information or data sent from other devices or chips.

In an embodiment, the chip 700 may further include an output interface 740. The processor 710 may control the output interface 740 to communicate with other devices or chips, specifically, may send information or data to other devices or chips.

In an embodiment, the chip may be applied to a network device of an embodiment of the present application, and the chip may implement a corresponding process implemented by the network device in each method according to an embodiment of the present application, which will not be repeated here for the sake of brevity.

In an embodiment, the chip may be applied to a mobile terminal/terminal device of an embodiment of the present application, and the chip may implement a corresponding process implemented by the mobile terminal/terminal device in each method according to an embodiment of the present application, which will not be repeated here for the sake of brevity.

It should be understood that the chip mentioned in the embodiment of the present application may also be referred to as a system-level chip, a system chip, a chip system, or a system-on-chip, etc.

An embodiment of the present application also provides a communication system. The communication system includes a terminal device and a network device. The terminal device may be applied to implement a corresponding function implemented by the terminal device in the above-mentioned method, and the network device may be applied to implement a corresponding function implemented by the network device in the above-mentioned method, which will not be repeated here for the sake of brevity.

It should be understood that a processor of an embodiment of the present application may be an integrated circuit chip with signal processing capability. In an implementation process, each step of the above-mentioned method embodiment may be accomplished by an integrated logic circuitry in hardware of the processor or by an instruction in a form of software. The above-mentioned processor may be a general purpose processor, a digital signal processor (DSP), an application specific integrated circuit (ASIC), a field programmable gate array (FPGA) or another programmable logic device, a discrete gate or a transistor logic device, or a discrete hardware component. Each method, step, and logical block diagram disclosed in an embodiment of the present application may be implemented or performed. The general purpose processor may be a microprocessor or the processor may also be any conventional processor, etc. Steps of the method disclosed in combination with an embodiment of the present application may be directly embodied as performed by a hardware decoding processor, or performed with a combination of hardware and software modules in the decoding processor. A software module may be located in a random memory, a flash memory, a read-only memory, a programmable read-only memory or an electrically rewritable programmable memory, a register, and other storage media well established in the art. The storage medium is located in a memory and the processor reads information in the memory and completes the steps of the above-mentioned method in combination with its hardware.

It will be understood that the memory in an embodiment of the present application may be a volatile memory or a non-volatile memory, or may include both a volatile and a non-volatile memory. Where, the non-volatile memory may be a read-only memory (ROM), a programmable ROM (PROM), an erasable programmable read-only memory (EPROM), an electrically erasable programmable read-only memory (EPROM), an electrically EPROM (EEPROM), or a flash memory. The volatile memory may be a random access memory (RAM), which is used as an external cache. By way of an exemplary but not restrictive description, many forms of RAM are available, such as a static RAM (SRAM), a dynamic RAM (DRAM), a synchronous DRAM (SDRAM), a double data rate SDRAM (DDR SDRAM), an enhanced SDRAM (ESDRAM), a synchlink DRAM (SLDRAM), and a direct Rambus RAM (DR RAM). It should be noted that, the memory of the system and method described herein are intended to include, but are not limited to, these and any other suitable types of memories.

It should be understood that the above-mentioned memory is an exemplary but not restrictive description, for example, the memory in an embodiment of the present application may also be a static RAM (SRAM), a dynamic RAM (DRAM), a synchronous DRAM (SDRAM), a double data rate SDRAM (DDR SDRAM), an enhanced SDRAM (ESDRAM), a synchronous link DRAM (SLDRAM), and a direct Rambus RAM (DRAM), etc. That is, the memory in an embodiment of the present application is intended to include, but is not limited to, these and any other suitable types of memory.

An embodiment of the present application also provides a computer-readable storage medium, configured to store a computer program.

In an embodiment, the computer-readable storage medium may be applied to a network device of an embodiment of the present application, and the computer program enables a computer to implement a corresponding process implemented by the network device in each method according to an embodiment of the present application, which will not be repeated here for the sake of brevity.

In an embodiment, the computer-readable storage medium may be applied to a mobile terminal/terminal device of an embodiment of the present application, and the computer program enables a computer to implement a corresponding process implemented by the mobile terminal/terminal device in each method according to an embodiment of the present application, which will not be repeated here for the sake of brevity.

An embodiment of the present application also provides a computer program product, including a computer program instruction.

In an embodiment, the computer program product may be applied to a network device of an embodiment of the present application, and the computer program instruction enables a computer to implement a corresponding process implemented by the network device in each method according to an embodiment of the present application, which will not be repeated here for the sake of brevity.

In an embodiment, the computer program product may be applied to a mobile terminal/terminal device of an embodiment of the present application, and the computer program instruction enables a computer to implement a corresponding process implemented by the mobile terminal/terminal device in each method according to an embodiment of the present application, which will not be repeated here for the sake of brevity.

An embodiment of the present application also provides a computer program.

In an embodiment, the computer program may be applied to a network device of an embodiment of the present application, when the computer program runs on a computer, enables the computer to implement a corresponding process implemented by the network device in each method according to an embodiment of the present application, which will not be repeated here for the sake of brevity.

In an embodiment, the computer program may be applied to a mobile terminal/terminal device of an embodiment of the present application, when the computer program runs on a computer, enables the computer to implement a corresponding process implemented by the mobile terminal/terminal device in each method according to an embodiment of the present application, which will not be repeated here for the sake of brevity.

Those skilled in the art may realize that, units and algorithmic steps of each example described in combination with the embodiments disclosed herein are capable of being implemented in electronic hardware, or a combination of computer software and electronic hardware. Whether these functions are performed in hardware or software depends on a particular application and a design constraint of the technical solution. Those skilled may use a different method to implement a described function for each particular application, but such implementation should not be considered outside the scope of the present application.

Those skilled in the art may clearly understand that, for the convenience and conciseness of description, the specific working process of the above-described system, device, and unit may refer to a corresponding process in the above-mentioned method embodiment, which is not repeated here.

In several embodiments provided in the present application, it should be understood that the disclosed systems, apparatus and methods, may be implemented in other ways. For example, the embodiments of the devices described above are merely schematic, for example, the division of the units, which is only a logical functional division, may be practically implemented in another way, for example, multiple units or components may be combined or may be integrated into another system, or some features may be ignored, or not implemented. On another point, a mutual coupling or a direct coupling or a communication connection shown or discussed may be indirect coupling or a communication connection through some interfaces, apparatus or units, which may be electrical, mechanical or other forms.

The unit illustrated as a separate component may or may not be physically separated, and the component is shown as a unit may or may not be a physical unit, i.e., they may be located in one place or may be distributed to a plurality of network units. Some or all of these units may be selected according to practical needs to achieve a purpose of a solution of the present embodiment.

In addition, each functional unit in each embodiment of the present application may be integrated into a single processing unit, or each unit may be physically present separately, or two or more units may be integrated into a single unit.

If the function is implemented in a form of a software functional unit and sold or used as an independent product, it may be stored in a computer-readable storage medium. Based on this understanding, a technical solution of the present application essentially or a part that contributes to the existing technology or a part of the technical solution may be embodied in a form of a software product, and the computer software product is stored in a storage medium, including several instructions which used to make a computer device (may be a personal computer, a server, or a network device, etc.) to execute all or part of steps of methods according to the various embodiments of the present application. The aforementioned storage media includes: a U disk, a mobile hard disk, a read-only memory (ROM), a random access memory (RAM), a magnetic disk or an optical disk and another medium that may store a program code.

The above-mentioned are only a specific implementation of the present application, but a protection scope of the present application is not limited to this. Any person skilled in the art may easily think of a change or a substitution within a technical scope disclosed in the present application, which should be covered within the protection scope of the present application. Therefore, the protection scope of the present application should be subject to the protection scope of the claims.

What is claimed is:

1. A wireless communication method, comprising:
   determining, by a terminal device, according to first information, whether to retransmit deprioritized data on a configured grant resource and/or determining a target resource location for retransmitting the deprioritized data, wherein the first information comprises at least one of the following:
   a running state of a configured grant timer;
   a configured grant resource location after the configured grant timer is started;
   whether the deprioritized data is scheduled during a first time period after the configured grant timer is started;
   whether the deprioritized data is transmitted during a second time period after the configured grant timer is started; and
   whether the deprioritized data is cleared during a third time period after the configured grant timer is started;
   wherein the first information comprises whether the deprioritized data is scheduled during the first time period after the configured grant timer is started;
   wherein the determining, by the terminal device, according to the first information, whether to retransmit the deprioritized data on the configured grant resource and/or determining the target resource location for retransmitting the deprioritized data comprises:
   determining to retransmit the deprioritized data, in a condition that the deprioritized data is not scheduled during the first time period after the configured grant timer is started.

2. The method according to claim 1, wherein the determining, by the terminal device, according to the first information, whether to retransmit the deprioritized data on the configured grant resource and/or determining the target resource location for retransmitting the deprioritized data comprises:
   determining a first configured grant resource location after the configured grant timer is started as the target resource location.

3. The method according to claim 2, wherein the first configured grant resource location is one of the following:
   at least one configured grant resource location after the configured grant timer is started;
   a 1-st configured grant resource location after the configured grant timer is started;
   first N configured grant resource locations after the configured grant timer is started, wherein N is an integer greater than 1;
   at least one configured grant resource location after a first time instant after the configured grant timer is started;
   a 1-st configured grant resource location after the first time instant after the configured grant timer is started;
   first N configured grant resource locations after the first time instant after the configured grant timer is started, wherein N is an integer greater than 1;
   at least one configured grant resource location after the configured grant timer expires;
   a 1-st configured grant resource location after the configured grant timer expires;
   first N configured grant resource locations after the configured grant timer expires, wherein N is an integer greater than 1;
   at least one configured grant resource location after a second time instant after the configured grant timer expires;
   a 1-st configured grant resource location after the second time instant after the configured grant timer expires; and
   first N configured grant resource locations after the second time instant after the configured grant timer expires, wherein N is a positive integer greater than 1.

4. The method according to claim 1, wherein the determining, by the terminal device, according to the first information, whether to retransmit the deprioritized data on the configured grant resource and/or determining the target resource location for retransmitting the deprioritized data further comprises:
   determining a second configured grant resource location after the first time period as the target resource location in a condition that it is determined to retransmit the deprioritized data.

5. The method according to claim 4, wherein the second configured grant resource location is one of the following:
   at least one configured grant resource location after the first time period;
   first N configured grant resource locations after the first time period, wherein N is a positive integer greater than 1; and
   a 1-st configured grant resource location after the first time period.

6. The method according to claim 1, wherein the first time period is one of the following:
   a time period from when the configured grant timer is started to a 1-st configured grant resource location after the configured grant timer is started;
   a time period from when the configured grant timer is started to an M-th configured grant resource location after the configured grant timer is started, wherein M is an integer greater than 1;
   a time period from when the configured grant timer is started to when the configured grant timer expires;
   at least part of the time period from when the configured grant timer is started to when the configured grant timer expires;
   a time period from when the configured grant timer is started to a 1-st configured grant resource location after the configured grant timer expires;
   a time period from when the configured grant timer is started to an M-th configured grant resource location after the configured grant timer expires, wherein M is an integer greater than 1;

a time period from when the configured grant timer is started to a third time instant after the configured grant timer expires;

a time period from when the configured grant timer is started to a 1-st configured grant resource location after the third time instant after the configured grant timer expires;

a time period from when the configured grant timer is started to an M-th configured grant resource location after the third time instant after the configured grant timer expires, wherein M is an integer greater than 1;

a time period from when the configured grant timer expires to a 1-st configured grant resource location after the configured grant timer expires;

a time period from when the configured grant timer expires to an M-th configured grant resource location after the configured grant timer expires, wherein M is an integer greater than 1;

a time period from when the configured grant timer expires to the third time instant after the configured grant timer expires;

a time period from when the configured grant timer expires to a 1-st configured grant resource location after the third time instant after the configured grant timer expires; and, a time period from when the configured grant timer expires to an M-th configured grant resource location after the third time instant after the configured grant timer expires, wherein M is an integer greater than 1.

7. The method according to claim 1, wherein the first information comprises whether the deprioritized data is transmitted during the second time period after the configured grant timer is started;

wherein the determining, by the terminal device, according to the first information, whether to retransmit the deprioritized data on the configured grant resource and/or determining the target resource location for retransmitting the deprioritized data comprises:

determining to retransmit the deprioritized data in a condition that the deprioritized data is not transmitted during the second time period after the configured grant timer is started.

8. The method according to claim 7, wherein the determining, by the terminal device, according to the first information, whether to retransmit the deprioritized data on the configured grant resource and/or determining the target resource location for retransmitting the deprioritized data further comprises:

determining a third configured grant resource location after the second time period as the target resource location in a condition that it is determined to retransmit the deprioritized data.

9. The method according to claim 8, wherein the third configured grant resource location is one of the following:

at least one configured grant resource location after the second time period;

first N configured grant resource locations after the second time period, wherein N is a positive integer; and a 1-st configured grant resource location after the second time period.

10. The method according to claim 7, wherein the second time period is one of the following:

a time period from when the configured grant timer is started to a 1-st configured grant resource location after the configured grant timer is started;

a time period from when the configured grant timer is started to an M-th configured grant resource location after the configured grant timer is started, wherein M is an integer greater than 1;

a time period from when the configured grant timer is started to when the configured grant timer expires;

at least part of the time period from when the configured grant timer is started to when the configured grant timer expires;

a time period from when the configured grant timer is started to a 1-st configured grant resource location after the configured grant timer expires;

a time period from when the configured grant timer is started to an M-th configured grant resource location after the configured grant timer expires, wherein M is an integer greater than 1;

a time period from when the configured grant timer expires to a 1-st configured grant resource location after the configured grant timer expires;

a time period from when the configured grant timer expires to an M-th configured grant resource location after the configured grant timer expires, wherein M is an integer greater than 1;

a time period from when the configured grant timer is started to a fourth time instant after the configured grant timer expires;

a time period from when the configured grant timer is started to a 1-st configured grant resource location after the fourth time instant after the configured grant timer expires;

a time period from when the configured grant timer is started to an M-th configured grant resource location after the fourth time instant after the configured grant timer expires, wherein M is an integer greater than 1;

a time period from when the configured grant timer expires to a fourth time instant after the configured grant timer expires;

a time period from when the configured grant timer expires to a 1-st configured grant resource location after the fourth time instant after the configured grant timer expires; and a time period from when the configured grant timer expires to an M-th configured grant resource location after the fourth time instant after the configured grant timer expires, wherein M is an integer greater than 1.

11. The method according to claim 1, wherein the first information comprises whether the deprioritized data is cleared during the third time period after the configured grant timer is started;

wherein the determining, by the terminal device, according to the first information, whether to retransmit the deprioritized data on the configured grant resource and/or determining the target resource location for retransmitting the deprioritized data comprises:

determining to retransmit the deprioritized data in a condition that the deprioritized data is not cleared during the third time period after the configured grant timer is started.

12. The method according to claim 11, wherein the determining, by the terminal device, according to the first information, whether to retransmit the deprioritized data on the configured grant resource and/or determining the target resource location for retransmitting the deprioritized data further comprises:

determining a fourth configured grant resource location after the third time period as the target resource location in a condition that it is determined to retransmit the deprioritized data.

13. The method according to claim 12, wherein the fourth configured grant resource location is one of the following:
   at least one configured grant resource location after the third time period;
   first N configured grant resource locations after the third time period, wherein N is a positive integer; and,
   a 1-st configured grant resource location after the third time period.

14. The method according to claim 11, wherein the third time period is one of the following:
   a time period from when the configured grant timer is started to a 1-st configured grant resource location after the configured grant timer is started;
   a time period from when the configured grant timer is started to an M-th configured grant resource location after the configured grant timer is started, wherein M is an integer greater than 1;
   a time period from when the configured grant timer is started to when the configured grant timer expires,
   at least part of the time period from when the configured grant timer is started to when the configured grant timer expires;
   a time period from when the configured grant timer is started to a 1-st configured grant resource location after the configured grant timer expires;
   a time period from when the configured grant timer is started to an M-th configured grant resource location after the configured grant timer expires, wherein M is an integer greater than 1;
   a time period from when the configured grant timer expires to a 1-st configured grant resource location after the configured grant timer expires;
   a time period from when the configured grant timer expires to an M-th configured grant resource location after the configured grant timer expires, wherein M is an integer greater than 1;
   a time period from when the configured grant timer is started to a fifth time instant after the configured grant timer expires;
   a time period from when the configured grant timer is started to a 1-st configured grant resource location after the fifth time instant after the configured grant timer expires;
   a time period from when the configured grant timer is started to an M-th configured grant resource location after the fifth time instant after the configured grant timer expires, wherein M is an integer greater than 1;
   a time period from when the configured grant timer expires to the fifth time instant after the configured grant timer expires;
   a time period from when the configured grant timer expires to a 1-st configured grant resource location after the fifth time instant after the configured grant timer expires; and
   a time period from when the configured grant timer expires to an M-th configured grant resource location after the fifth time instant after the configured grant timer expires, wherein M is an integer greater than 1.

15. The method according to claim 1, wherein the method further comprises:
   receiving, by the terminal device, configuration information sent by a network device, wherein the configuration information is used to configure at least one of the following:
   a period of the configured grant resource;
   an identity of the configured grant resource;
   a hybrid automatic repeat request (HARQ) process number corresponding to the configured grant resource;
   a configured grant timer for the HARQ process of the configured grant resource; and
   an automatic retransmission activation indication, wherein the automatic retransmission activation indication is used to indicate the terminal device to use the configured grant resource to retransmit the deprioritized data, or to indicate whether the terminal device determines, according to the first information, whether to retransmit the deprioritized data on the configured grant resource and/or determines the target resource location for retransmitting the deprioritized data.

16. The method according to claim 15, wherein the automatic retransmission activation indication is for the configured grant resource, or the automatic retransmission activation indication is for a specific HARQ process of the configured grant resource, or the automatic retransmission activation indication is for a specific terminal device, or the automatic retransmission activation indication is for a specific HARQ process.

17. The method according to claim 16, wherein the deprioritized data is data to be transmitted by scheduling on the configured grant resource, data to be transmitted using the specific HARQ process, data to be transmitted using the specific HARQ process corresponding to the configured grant resource, or deprioritized data to be transmitted on the specific terminal device.

18. A terminal device, comprising: a processor and a memory, the memory is configured to store a computer program, the processor is configured to call and run the computer program to:
   determine, according to first information, whether to retransmit deprioritized data on a configured grant resource and/or determine a target resource location for retransmitting the deprioritized data, wherein the first information comprises at least one of the following:
   a running state of a configured grant timer;
   a configured grant resource location after the configured grant timer is started;
   whether the deprioritized data is scheduled during a first time period after the configured grant timer is started;
   whether the deprioritized data is transmitted during a second time period after the configured grant timer is started;
   whether the deprioritized data is cleared during a third time period after the configured grant timer is started;
   wherein the first information comprises whether the deprioritized data is scheduled during the first time period after the configured grant timer is started;
   wherein the processor is further configured to call and run the computer program to:
   determine to retransmit the deprioritized data, in a condition that the deprioritized data is not scheduled during the first time period after the configured grant timer is started.

19. A non-transitory_computer-readable storage medium, wherein the non-transitory_computer-readable storage medium is configured to store a computer program, the computer program enables a computer to execute the following step:

determining, by a terminal device, according to first information, whether to retransmit deprioritized data on a configured grant resource and/or determining a target resource location for retransmitting the deprioritized data, wherein the first information comprises at least one of the following:

a running state of a configured grant timer;

a configured grant resource location after the configured grant timer is started;

whether the deprioritized data is scheduled during a first time period after the configured grant timer is started;

whether the deprioritized data is transmitted during a second time period after the configured grant timer is started; and whether the deprioritized data is cleared during a third time period after the configured grant timer is started;

wherein the first information comprises whether the deprioritized data is scheduled during the first time period after the configured grant timer is started;

wherein the determining, by the terminal device, according to the first information, whether to retransmit the deprioritized data on the configured grant resource and/or determining the target resource location for retransmitting the deprioritized data comprises:

determining to retransmit the deprioritized data, in a condition that the deprioritized data is not scheduled during the first time period after the configured grant timer is started.

* * * * *